(12) United States Patent
Turner

(10) Patent No.: US 8,782,540 B2
(45) Date of Patent: Jul. 15, 2014

(54) CONTENT, TRAFFIC AND ADVERTISING ENGINE, SYSTEM AND METHOD

(75) Inventor: Tod C. Turner, Kenmore, WA (US)

(73) Assignee: Uniloc Luxembourg, S.A., Luxembourg (LU)

(*) Notice: Subject to any disclaimer, the term of this patent is extended or adjusted under 35 U.S.C. 154(b) by 639 days.

(21) Appl. No.: 12/545,129

(22) Filed: Aug. 21, 2009

(65) Prior Publication Data

US 2010/0050098 A1  Feb. 25, 2010

Related U.S. Application Data

(60) Provisional application No. 61/090,673, filed on Aug. 21, 2008, provisional application No. 61/090,680, filed on Aug. 21, 2008, provisional application No. 61/090,678, filed on Aug. 21, 2008, provisional application No. 61/090,688, filed on Aug. 21, 2008, provisional application No. 61/090,681, filed on Aug. 21, 2008, provisional application No. 61/090,684, filed on Aug. 21, 2008, provisional application No. 61/090,672, filed on Aug. 21, 2008.

(51) Int. Cl.
*G06F 3/048* (2013.01)

(52) U.S. Cl.
USPC .......................... 715/763; 715/861

(58) Field of Classification Search
CPC ....................................... H04L 67/28
USPC .................................................. 715/763, 861
See application file for complete search history.

(56) References Cited

U.S. PATENT DOCUMENTS

2005/0071325 A1* 3/2005 Bem ................................. 707/3
2007/0174340 A1* 7/2007 Gross ......................... 707/104.1
2009/0259691 A1* 10/2009 Tanskanen et al. ........... 707/200

* cited by examiner

*Primary Examiner* — Peiyong Weng
(74) *Attorney, Agent, or Firm* — Sean D. Burdick

(57) ABSTRACT

An engine, platform, system and method of interconnecting content generation, advertisement relevance, and traffic stimulation. The present invention may include the generation of one or more content items into a primary content window, the presentation of one or more content items in a secondary content window, a repeated crawl of the one or more content items in the primary content window, the presentation of a first plurality of advertisements relevant to the repeated crawl, the maintenance of a viewer of the primary content window at least partially based upon the one or more content items in the secondary content window, at least until the presentation of a second plurality of advertisements relevant to the repeated crawl, a targeting of at least one subset of traffic in accordance with the generation of the content in the primary content window, and a tracker that increases proportionally with the relevance of the first plurality of advertisements.

22 Claims, 22 Drawing Sheets

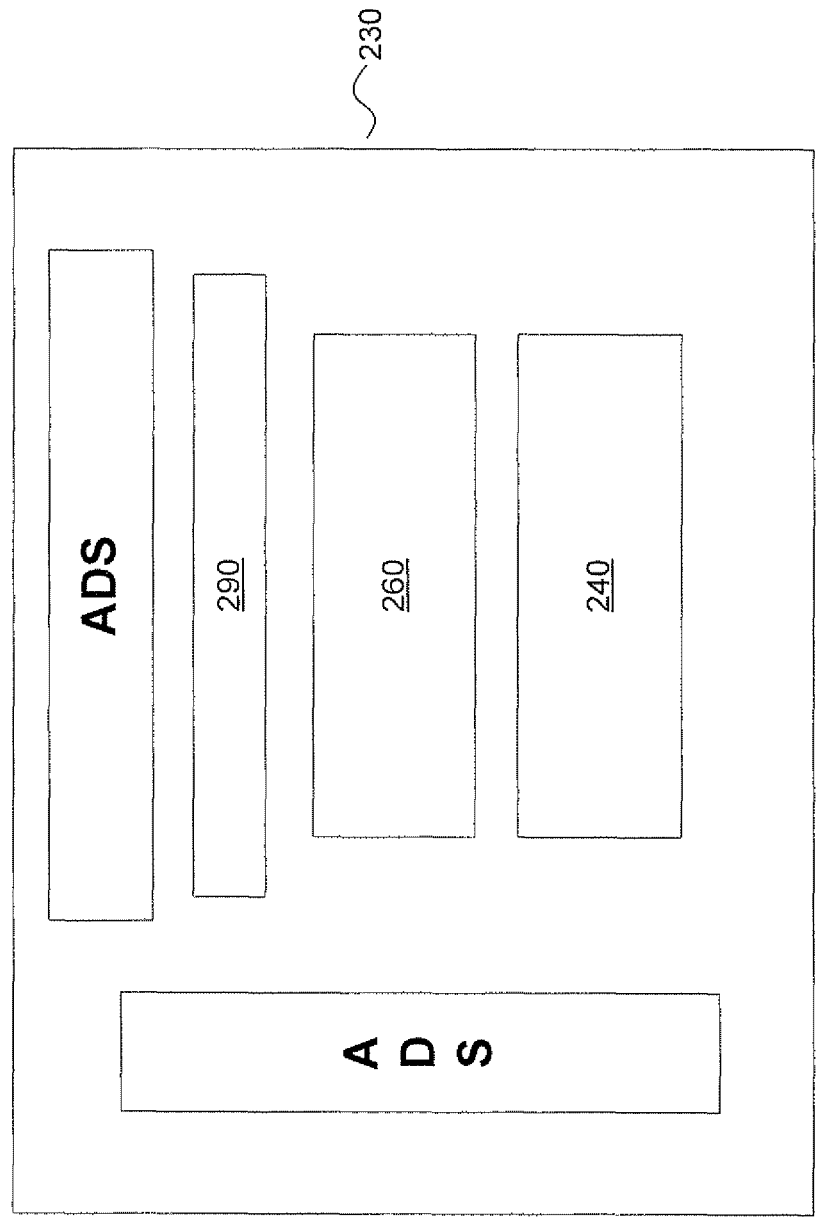

*Fig. 10*

My Account

Account Details

Display Name:
First Name:
Middle Name:
Last Name:
Email:
User Name:
Password: (click here to change your password)
Phone:
Image: (click here to upload an image)
Organization
Website:

Edit Account

Profile

CONTENT, TRAFFIC AND ADVERTISING ENGINE, SYSTEM AND METHOD

CROSS REFERENCE TO RELATED APPLICATIONS

This application claims priority of U.S. Patent Application Ser. Nos. 61/090,673 entitled: CONTENT, TRAFFIC AND ADVERTISING ENGINE, SYSTEM AND METHOD; 61/090,680 entitled: SYSTEM AND METHOD FOR AGGREGATING AND PROVIDING AUDIO AND VISUAL PRESENTATIONS VIA A COMPUTER NETWORK; 61/090,678 entitled: CONTENT, TRAFFIC AND ADVERTISING ENGINE, SYSTEM AND METHOD; 61/090,688 entitled: SYSTEM AND METHOD OF VALIDATING CONTENT, TRAFFIC AND ADVERTISING IN A COMPUTING APPLICATION AND ENGINE; 61/090,681 entitled: DYNAMIC READ THROUGH DATA COLLECTION AND AD DELIVERY SYSTEM AND METHOD OF SAME; 61/090,684 entitled: SYSTEM AND METHOD FOR TRAFFIC IN A CONTENT AND ADVERTISING ENGINE; and 61/090,672 entitled: System and Method for Providing and Tracking the Provision of Audio and Visual Presentations via a Computer Network, all having common inventor Tod C. Turner; and each of which is incorporated herein by reference as if set forth in its respective entirety herein.

BACKGROUND OF THE INVENTION

1. Field of the Invention

The present invention relates generally to computing and computing applications and, more particularly, to a content, traffic and advertising engine, system and method.

2. Description of the Background

The Internet is a global network connecting millions of computers and linking users in more than 100 countries into exchanges of data, news and opinions. Unlike online services, which are centrally controlled, the Internet is decentralized. Each Internet enabled computer is independent, such that its' user can choose which Internet services to use and which local services to make available to the global Internet community. There are many types of content available via the Internet, including textual content, graphical content, audio content and video content. The amount of content available via the Internet is virtually unlimited.

User generated content, such as "podcasting," is a rapidly growing new media format, particularly in the Internet space. Historically, such new media formats had difficulty finding success, in part because the content in such formats typically appeals to one or more "niche" markets, rather than the mass media market as a whole, and further in part because there has typically been a lack of financial support to incentivize platforms to carry such new media formatted content Recently, some platforms have begun to remedy this problem, in part by providing "one stop shopping," wherein a user can visit the platform and know that the platform will be able to provide some user-generated content of interest to that visiting user. Such platforms include YouTube and Funny or Die.

However, even these successful platforms provide little other than a place to find user-generated content. For example, such platforms do not efficiently direct or monitor traffic. Additionally, such platforms/sites tend to place advertisements on content pages that are relevant for the typical user of the site, or merely relevant to a cookie, or the like, of the then-subject user. As such, present successful platforms do not optimize traffic or advertising with respect to the content provided, nor to the platforms optimize the junction of content, traffic and advertising.

Thus, the need exists for an engine, system and method that optimizes traffic and advertising with respect to providing content, including user generated content, and that optimizes the junction of content, traffic and advertising.

SUMMARY OF THE INVENTION

The present invention includes an engine, platform, system and method of interconnecting content generation, advertisement relevance, and traffic stimulation. The present invention may include the generation of one or more content items into a primary content window, the presentation of one or more content items in a secondary content window, a repeated crawl of the one or more content items in the primary content window, the presentation of a first plurality of advertisements relevant to the repeated crawl, the maintenance of a viewer of the primary content window at least partially based upon the one or more content items in the secondary content window, at least until the presentation of a second plurality of advertisements relevant to the repeated crawl, a targeting of at least one subset of traffic in accordance with the generation of the content in the primary content window, and a tracker that increases proportionally with the relevance of the first plurality of advertisements. The content in the primary content window may be any type of content, such as RSS feed content.

Thus, the present invention provides an engine, system and method that optimizes traffic and advertising with respect to providing content, including user generated content, and that optimizes the junction of content, traffic and advertising.

Certain embodiments of the present invention may include a platform, comprising: a graphical user interface; one or more content items for presentation on a web page to a user of said graphical user interface, wherein said one or more content items comprise at least one RSS feed and at least one selected from the group consisting of audio, video, photographs, data files, metadata, blogs, and links; one or more advertisements presented on a web page of the graphical user interface in accordance with a relevance to said one or more content items in view of the user, wherein the relevance increases over time; and a relevancy increasing engine that performs at least one of an updating and a re-instantiation of the web page responsively to a timer, wherein the at least one of the updating and the re-instantiation exclusively provides the increase in the relevance of one or more content items on the web page.

Certain embodiments of the present invention may include a platform, comprising: a graphical user interface; one or more content items for presentation to a user of said graphical user interface, wherein said one or more content items comprise at least one selected from the group consisting of audio, video, photographs, data files, metadata, blogs, and links, and wherein said one or more content items are provided to said graphical user interface via at least two of user uploaded content, links to remote content, live content creation, content streaming, and RSS feeds; one or more advertisements presented to the user of the graphical user interface in accordance with a relevance to said one or more content items in view of the user; and an interconnection for using the relevance to increase traffic accessing said graphical user interface; wherein said one or more content items presented comprise modifiable content, and wherein modification of said one or more content items modifies, in substantially real time, said one or more advertisements presented to the user, and wherein the modifiability of said one or more content items at least partially further increases the traffic via said interconnection.

Certain embodiments of the present invention may include a method of interconnecting content generation, advertisement relevance, and traffic stimulation, at a web-based platform, comprising: generating one or more content items into a primary content window; presenting one or more content items in a secondary content window; repeatedly crawling the one or more content items in the primary content window; presenting a first plurality of advertisements relevant to said repeatedly crawling; maintaining a viewer of the primary content window at least partially based upon the one or more content items in the secondary content window, at least until presenting a second plurality of advertisements relevant to said repeatedly crawling; targeting at least one subset of traffic in accordance with said generating; and tracking said targeting, wherein said tracking increases proportionally with the relevance of the first plurality of advertisements.

Certain embodiments of the present invention may include a method for tracking digital media presentations delivered from a first computer system to a user's computer via a network comprising: providing a corresponding web page to the user's computer for each digital media presentation to be delivered using the first computer system; providing a identifier data to the user's computer using the first computer system; providing an applet to the user's computer for each digital media presentation to be delivered using the first computer system, wherein the applet is operative by the user's computer as a timer; receiving at least a portion of the identifier data from the user's computer responsively to the timer applet each time a predetermined temporal period elapses using the first computer system; and, storing data indicative of the received at least portion of the identifier data using the first computer system; wherein each provided webpage causes corresponding digital media presentation data to be streamed from a second computer system distinct from the first computer system directly to the user's computer independent of the first computer system; and wherein the stored data is indicative of an amount of time the digital media presentation data is streamed from the second computer system to the user's computer.

Certain embodiments of the present invention may include a method for providing content via a computer network and computing device, the method comprising: storing data associated with a plurality of audio/visual presentations; storing data indicative of the plurality of audio/visual presentations so as to be associated with the stored data associated with the plurality of audio/visual presentations; receiving a request to host an audio presentation via the computer network from the computing device; receiving data associated with the requested audio presentation via the computer network from the computing device; storing the received data associated with the requested audio presentation; initiating a telephone call independent of the computing device dependently upon the stored data associated with the requested audio presentation; recording the telephone calls; storing data indicative of the recorded telephone call so as to be associated with the stored data associated with the requested audio presentation; and, presenting at least a portion of the stored data associated with the audio/visual presentations and audio presentation for selection by the computing device; wherein, selection of the audiovisual and audio presentation associated data causes the stored data indicative of the selected audio/visual or audio presentation to be provided to the computing device for playback thereby via the computer network.

Certain embodiments of the present invention may include a method for providing content via a computer network and computing system, the method comprising: storing data associated with a first plurality of presentations using the computer system; storing data indicative of the first plurality of presentations so as to be associated with the stored data associated with the first plurality of presentations using the computer system; storing data associated with a plurality of feeds using the computer system, wherein each of the feeds provides a corresponding second plurality of presentations being accessible via the computer network, and no data indicative of the second plurality of presentations is stored using the computing system; automatically and periodically accessing each of the feeds to identify each of the provided second plurality of presentations, using the computer system; and aggregating each of the first and identified second pluralities of presentations for delivery via the computer network using a common web page.

Certain embodiments of the present invention may include a computer program product being embodied in at least one computer readable medium and for providing content from a computer system via a computer network to a computer device, the product comprising: code for storing data associated with a first plurality of presentations using the computer system; code for storing data indicative of the first plurality of presentations so as to be associated with the stored data associated with the first plurality of presentations using the computer system; code for storing data associated with a plurality of feeds using the computer system, wherein each of the feeds provides a corresponding second plurality of presentations being accessible via the computer network, and no data indicative of the second plurality of presentations is stored using the computer system; code for automatically and periodically accessing each of the feeds to identify each of the provided second plurality of presentations, using the computer system; code for storing data associated with a third plurality of presentations, wherein data indicative of the third plurality of presentations is not stored using the computer system; and code for aggregating each of the first, identified second and third pluralities of presentations for delivery via the computer network using a common web page.

Certain embodiments of the present invention may include an engine for validating a plurality of RSS feeds, comprising: a crawler for crawling the plurality of RSS feeds, wherein said crawler categorically posts, to one or more web pages, user accessible links to an electronic location of one or more of the plurality of RSS feeds; a validator, wherein said validator receives from said crawler an identification of each of the posted ones of the user accessible links, an identification of content associated with a respective one of the one or more RSS feeds, a time of a last modification of the content of the respective one of the one or more RSS feeds, an identification of the electronic location of the respective one of the one or more RSS feeds, and a time of a last one of the categorical postings referring to the electronic location of the respective one of the one or more RSS feeds; and a timer, wherein, upon expiration of a time after one of the time of the last modification, and the time of the last one of the categorical postings, said timer effectuates a validation by said validator of the content of the respective one of the one or more RSS feeds.

Certain embodiments of the present invention may include a platform, comprising: one or more content items for presentation on a web page to a user, wherein said one or more content items comprise at least one RSS feed and at least one selected from the group consisting of audio, video, photographs, data files, metadata, blogs, and links; one or more advertisements presented on a web page of the graphical user interface in accordance with a relevance to said one or more content items in view of the user, wherein the relevance increases over time; and a relevancy increasing engine that performs at least one of an updating and a re-instantiation of the web page responsively to a timer, wherein the at least one of the updating and the re-instantiation exclusively provides the increase in the relevance of said one or more content items on the web page.

Certain embodiments of the present invention may include an advertising optimization platform, comprising: a recommendation engine; a graphical user interface; and one or more content items for presentation to a user of said graphical user interface, wherein said one or more content items comprise at least one selected from the group consisting of audio, video, photographs, data files, metadata, blogs, and links, and wherein said one or more content items are provided to said graphical user interface via at least two of user uploaded content, links to remote content, live content creation, content streaming, and RSS feeds; wherein the recommendation engine effectuates a presentation of one or more advertisements to the user of the graphical user interface in accordance with a correlation of said one or more content items presented to the user and the attributes of the user.

BRIEF DESCRIPTION OF THE FIGURES

The present invention will be described hereinbelow in conjunction with the following figures, in which like numerals represent like items, and wherein:

FIG. 10 illustrates an electronic document according to an embodiment of the present invention;

DETAILED DESCRIPTION OF THE INVENTION

Figure 1:
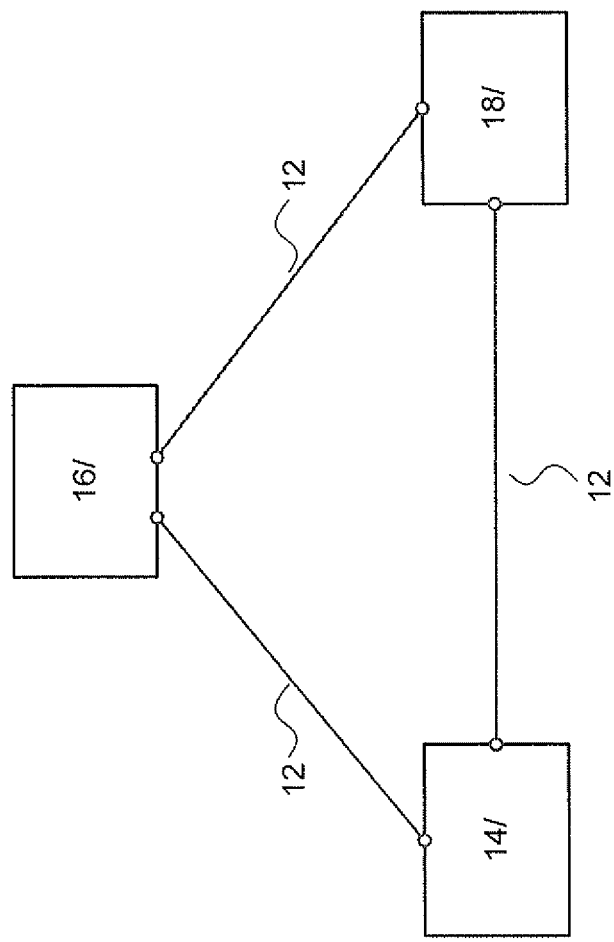
FIG. 1 illustrates an aspect of the present invention.

It is to be understood that the figures and descriptions of the present invention have been simplified to illustrate elements that are relevant for a clear understanding of the present invention, while eliminating, for the purposes of clarity, many other elements found in typical computing apparatuses, engines, systems and methods. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

"Computer", as referred to herein, may refer, without limitation, to any general purpose stationary or mobile computing device that includes a processor. "Processor", as used herein, refers generally to a device including a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, refers to one or more devices capable of storing data, such as in the form of chips. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further non-limiting example only. Memory may be internal or external to an integrated unit including the processor. Memory may be internal or external to the computer. Such memory may store a computer program, e.g., code or a sequence of instructions being operable by the processor. Such a computer may include one or more data inputs. Such a computer may include one or more data outputs. The code stored in memory may cause the processor, when executed by the processor, to set an output to a value responsively to a sensed input.

One type of computer executable code typically stored in memory so as to be executable by an Internet enabled computer is a browser application. For non-limiting purposes of explanation, "browser" as used herein generally refers computer executable code used to locate and display web pages. Commercially available browsers include Microsoft Internet Explorer, Netscape Navigator, Apple Safari and Firefox, which all support text, graphics and multimedia information, including sound and video (sometimes through browser plug-in applications). "Plug-in", as used herein, generally refers to computer executable code that adds a specific feature or service to a larger system, in the case of a browser plug-in, the browser application.

RSS, often referred to as really simple syndication, is a feature that easily enables a user to get fresh content delivered directly whenever an update is made on any of the favorite sites selected. Subscribing to an RSS feed may eliminate the need to surf the entire Web to find desired information. Instead, the headlines and summaries of topics of interest may be received in one convenient location. For example, more information on a particular item may be accessed by clicking the included link to access the full story. RSS may use XML (extensible markup language) to share and distribute content. The benefit of RSS is the aggregation of content from multiple sources in one place. RSS operates to scan the web and provide information aggregated based on a given scanned topic. RSS content may be read using software called an "RSS reader", "feed reader," or an "aggregator," which may be web-based or desktop-based. A standardized XML file format allows the information to be published once and viewed by many different programs. A user may subscribe to a feed by entering the feed's link into the reader or by clicking an RSS icon in a browser that initiates the subscription process. The RSS reader checks the user's subscribed feeds regularly for new content, downloads any updates that it finds, and provides a user interface to monitor and read the feeds.

There are a number of ways to receive one or multiple RSS feeds. A user may install a news reader (also referred to as an aggregator) that shows the RSS feeds that are subscribed to, which allows the user to view all the headlines pulled from designated favorite web sites. Once a user has selected the method most convenient delivery method, a visit to the desired subscribing feed and clicking the appropriate icon, for example, next to the feed, or manually copying and pasting the URL that appears with a click on the "RSS" button to view.

According to certain embodiments of the present invention, content may be aggregated for presentation to users. According to certain embodiments of the present invention, audio content may be aggregated for presentation to users. According to certain embodiments of the present invention, video content may be aggregated for presentation to users. According to certain embodiments of the present invention, audio and video content may be aggregated for presentation to users.

FIG. 1 is a schematic diagram illustrating aspects of the present invention. As illustrated in FIG. 1, the present invention includes an engine, apparatus and platform 10 that provides a nexus and interconnection 12 between content provision 14, advertisements and selection of advertising presented to online users 16, and generation and cultivation of web site traffic 18. As such, the present invention includes a platform constituted by one or more computing instructions that can be executed by a CPU as part of one or more software applications that make up the platform of the present invention. The instant invention may provide one or more graphical user interfaces (also referred to herein as GUI) that allow for viewing of content and/or advertisements, and/or for directing, defining or modifying content, traffic, advertisements, or the interactions therebetween.

Figure 1A:
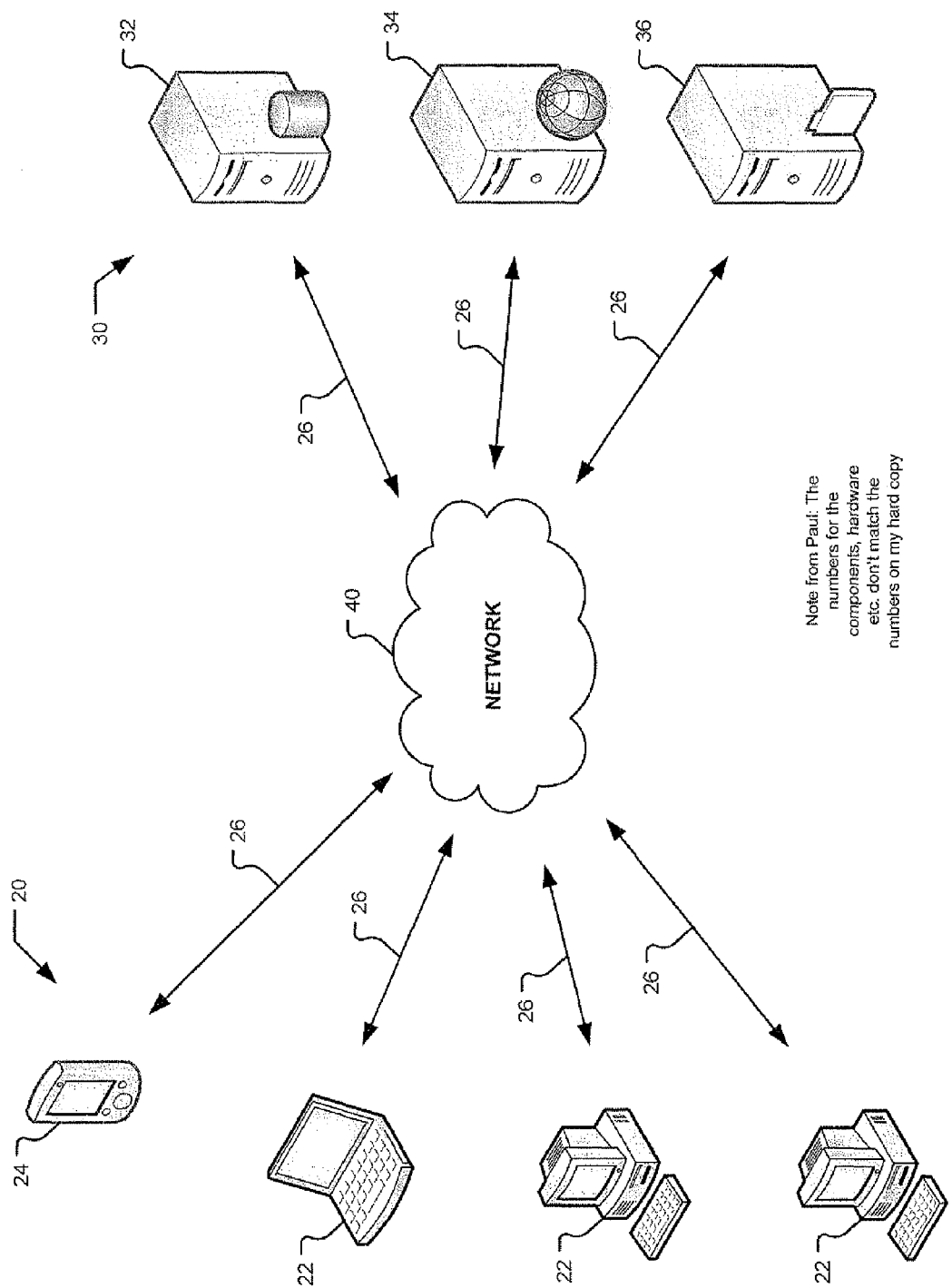
FIG. 1A illustrates a block diagram of a system of networked computers.

Referring now to FIG. 1A, there is shown a block diagram of a system of networked computers 10. Illustrated system 10 includes personal computing devices 22 and a personal digital assistant computer 24 by way of a non-limiting example only. Communication links 26 communicatively couple devices 20 with network 40. Links 26 may take the form of wired and/or wireless communications links, including fiber optic, POTS, DSL, cable and/or multiple access or GSM based wireless telephony or data communications systems, for example. Network 40 may include portions of proprietary and service provider networks, as well as the Internet, for example. Illustrated system 10 includes a database server 32, a content or web server 34 and a file server 36, all by way of non-limiting example only. Communication links 26 communicatively couple devices 30 with network 40 as well.

Content, as used herein, is and includes any known content type, including, for example, audio or audio files, video or video files, photographs or picture files, data files, metadata and/or metadata associated with and/or indicative of other types of files or file characteristics, header information associated with a file or files, and the like, broadcast or received via any known content transfer mechanism, including but not limited to analog or digital file passed via a network such as the Internet, an intranet, an extranet, a cellular network, a landline telephonic network, and the like.

Figure 2:
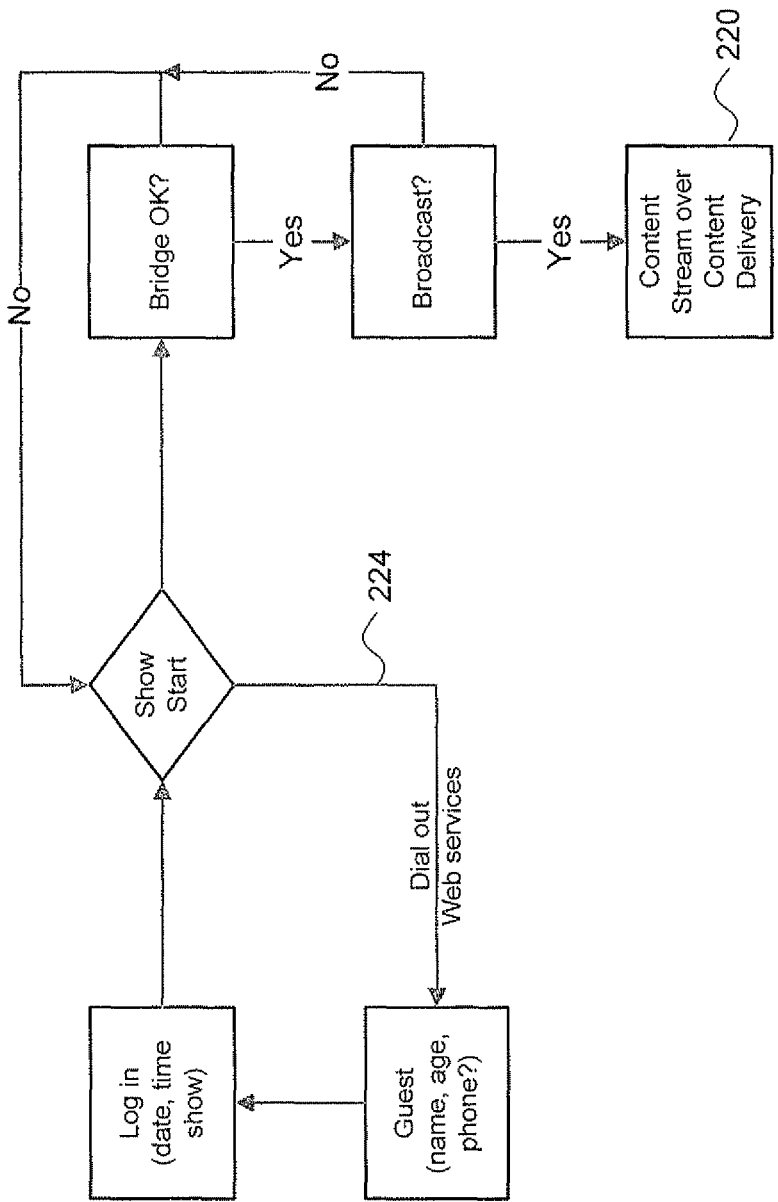
FIG. 2 illustrates an aspect of the present invention.

The present invention allows for the addition of content through any of a variety of known content addition methodologies, including but not limited to user uploaded content, links to remote content, live content creation upload, including content streaming, live or linked RSS feeds, and the like. In an exemplary embodiment with respect to the addition, upload, accessibility to, and/or aggregation of content, the block diagram of FIG. 2 illustrates the addition of audio content via the platform of the present invention. As illustrated in the exemplary embodiment of FIG. 2 with respect to audio, audio may be created as a live audio stream 220, and guests meeting certain criteria, such as guests having an allowable login, may access the live audio stream 222, or may be accessed by the Jive audio stream 224, such as via a phone bridge to a known telephonic address, at a known IP address, or the like. The instant exemplary embodiment is illustratively set forth with respect to audio, although those skilled in the art will well understand in light of the teachings herein that these exemplary embodiments will be equally applicable to other content types, such as those referenced hereinabove.

In the instant exemplary embodiment, as discussed herein, the platform of the present invention may "dial out" to an authorized listener to thereby provide a variety of additional services in conjunction with the content, that is, in this example, services and/or content in conjunction with the audio content. As such, using the "dial out" or any similar action that allows for an understanding of where the user/viewer/listener can be reached and/or located, may allow for myriad additional features in the present invention.

For example, a reverse IP lookup may be performed, and a pinpoint geographic location of broadcast listeners may be placed on a map, such as via an internet site such as Google Maps or Mapquest, for example, to thereby illustrate to all listeners of the program where other listeners of the broadcast are specifically located. Such mapping information, or any like information secondary to the content provided in the graphical user interface of the present invention, may be provided in one or more windows that are secondarily provided 240 along with the subject content in a content window 260 of the graphical user interface 230, as illustrated in FIG. 2A. Thereby, in addition to informing other users of the location of particular users, a host of the program or guests of the program may likewise gain knowledge of the location of specific users, such as wherein such specific users type, email, or via live or recorded voice, ask questions or leave messages with regard to the subject content, i.e. the subject program.

For example, the aforementioned secondary window may be one provided among a plurality of windows 240, which plurality may be provided to show or display, or provide information in conjunction with, the content provided. Such exemplary windows may include, as discussed hereinabove, a map window illustrating one or more users then listening to/participating in the program, or who have listened to the program in the past, wherein such users may constitute a subset of the users, a limited geographic view of a subset of the users, or the like. Such exemplary additional windows may further include a question window, in which certain users then listening to the program can submit questions to the provider of the program, and/or wherein the geographic location of the generation of such questions could be further illustrated to both the provider of the program and other listeners. Yet an additional window may be provided, such as wherein an additional window provides answers, or comments, from a host responsive to the questions posted in the question window. Thereby, answers can be matched to questions, geographic interest, and/or mapping, or the like.

The secondary windows referenced hereinabove may allow for communicating with the host and/or between users of the hosted application session and thus may, for example, be instant messaging windows that are capable of making use of the aforementioned instant messaging capabilities of one or more servers communicatively resident in the instant invention. Such an instant messaging application may either be running locally at the hosted application server 24, or may be running on a remote application server 24 and be delivered to the hosted application session. The instant messaging environment may be manually or automatically launched, with or without the hosts direction. Instant messaging software may take any form known to those skilled in the pertinent arts. Further, for example, censoring of such instant messaging windows may be performed at the hosted application server, or remotely prior to display of messages to users of the hosted application session. The messaging performed in such windows may be any messaging known to those skilled in the art, including text, graphic, audio and video messaging. Multiple windows that make use of messaging and messaging parameters may be provided, as discussed above, in accordance with the real-time messaging environment and GUI of the present invention, including, but not limited to, the Google maps embodiment discussed hereinabove. Further, in accordance with this instant messaging environment, the presence, names, or the like of other users, and the host, may be wholly, partially, or not displayed, as directed by the host, one or more users, or hosted application server. Additionally and alternatively, in dial-in embodiments in which a user is sent an invitation to dial-in, an invitation may be sent via the instant messaging system to the target user or users, and the invited user or users may accept or reject the invitation, as discussed hereinbelow with respect to conferencing embodiments.

In such exemplary embodiments, listeners can dial or login, or, as referenced hereinabove, a host can dial out and bridge in listeners if such listeners accept the call bridge and/or if the host and/or platform accepts the respective listener's login. Of course, in an exemplary embodiment in which a host dials out to bridge in listeners, a host has the ability to edit the primary or secondary window content of a program, such as by hanging up on a user, and/or by blocking the user's ability to dial or log back in, such as by allowing the host or platform to dial out to the user with a blocked caller ID number that will prevent the user from gaining knowledge of a number to which the user may call in at a later time.

Of course, not only may a host dial out to the users, as discussed hereinabove, a user may likewise dial in to gain access to content. Thereby, a user logging in may have access to previously recorded content, such as audio show content, which may be presented via the platform of the present invention as preexisting content 290. Further, those skilled in the art will appreciate that the aforementioned embodiments are exemplary only, and the present invention may similarly be employed with video content, pictorial content, textual content, and the like, and/or with any number of windows in the GUI equal to or greater than one window.

Thus, in accordance with log-in, dial-in, dial-in invite and/or dial-out exemplary embodiments, a shared, hosted application session between or among multiple participants may be established according to the present invention. For example, in one of the aforementioned exemplary embodiments, a host may establish a hosted application session. The server 24 used to deliver that hosted application session may be any platform capable of supporting the remote application protocol or protocols in use. In one of the aforementioned exemplary embodiments, the hosted application session may, at the direction of the host, dial out to those users who have requested, or been granted, access to the hosted application. Such users may all dial or log in, may be independently dialed at the direction of the host, may all be simultaneously dialed at the direction of the host, or may be dialed in groupings at the direction of the host, for example.

In an exemplary dial-out embodiment, the hosted application server may be, include, or be communicatively associated with, a conferencing server 24. The conferencing server may preferably be connected to the network 20, such as an Internet protocol based network. The conferencing server may have any of a number of capabilities typical of such conferencing servers, such as the ability to send/receive instant messaging requesting initiation of a call, and/or submitting information and/or parameters to allow for a call, from the conferencing server. The instant messaging parameters may be adapted to receive information in a tagged field format, such as HTML or XML, such that information contained in the message may be correctly parsed to allow the conferencing server to properly initiate, or request initiation of, a call bridge. The conferencing server may have one or more ports for connecting participants via a call bridge, such as by a VOIP path, or through a telephonic network.

For example, if a host desires to initiate a content generation session, the host application server may generate a message to the conferencing server identifying parties who are potential participants ("targets") to the session. The potential call targets may be identified by an alias identifying information associated with the potential targets stored in the conferencing server. Alternatively, the potential targets may be identified by phone numbers or other addresses for the potential targets. The conferencing server may parse the received message to determine the address of the selected targets. Parsing may involve stripping explicitly provided target phone numbers or VOIP addresses from the message, or converting aliases identified in a message. The conferencing server may then initiate or request initiation of a call bridge between the host and the targets.

Figure 3:
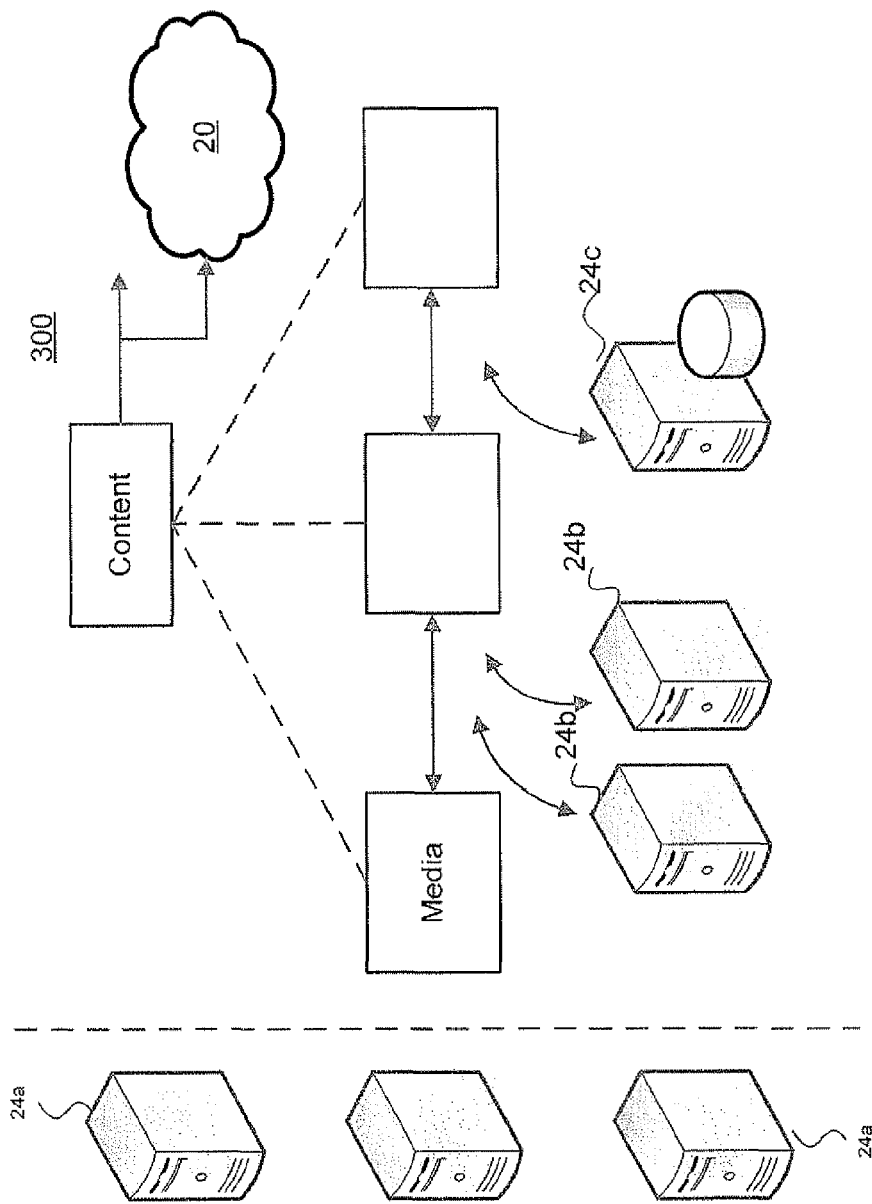
FIG. 3 illustrates an aspect of the present invention.

FIG. 3 is a block diagram illustrating an exemplary content delivery mechanism 300 for use in the present invention. As illustrated in FIG. 3 and discussed herein, the content delivery engine of the present invention may include access to a plurality of internet servers 24a, and a plurality of content, certain of which may be streamed as http, or like, content over the internet. A plurality of media servers 24b may then serve the content of the present invention to one or more users or listeners. Further, the content of the present invention may be stored as metadata on one or more SQL or other database servers 24c. Thus, through the use of the engine illustrated in FIG. 3, a table may be maintained of the metadata related to each computing user shell, i.e., content displayed or played to a user, and additionally or inclusively such table may further include the URL of a subject show.

Content delivered may be generated via anyone or more of a variety of content generation methodologies, as will be apparent to those skilled in the art in light of the discussion herein. For example, any registered or unregistered user may broadcast, or record for broadcast, as discussed hereinthroughout, audio, video, or data content, using, for example, an audio recorder, camera, video camera, telephone, PC or computing device, or cellular device, for example. The present invention further accounts for acceptance of content generated via newly available content generation methodologies, such as via podcasting, for example. Such podcasts are increasing multi-fold annually, and are projected to exceed 50 million podcasts by 2010. Thereby, due in part to the highly selective target audiences targeted by podcasters and like content generators, the content made available in the present invention may provide for a targeting of traffic to, and to aspects of the platform, engine, system and method of the present invention.

A plurality of information may be provided from the aspects of the present invention discussed hereinabove, and may be monitored and/or stored via, for example, the aforementioned database servers 24c. For example, the present invention may provide the ability to track the number of visitors to the platform of the present invention, and additionally the number of visitors per content via the platform of the present invention. Further, the number of pages viewed by each visitor may additionally be tracked, such as in a tabular format, and such information may be continuously updated for as long as a user remains on a given page, that is, for as long as a user continues to watch a particular show. Such tracking may be performed, for example, via entry into the table of timed data, such as wherein, at each expiration of the timer, such as every 15 seconds, a table entry is made of the user, the page the user is on, and, to the extent the user is on the same page as was the user upon the last expiration of the timer, the user's total time, to the current time, spent on that same page. The user may be identified by, for example, any of a number of known methodologies, such as the information the user used to login, the user's IP address, the user's response to an identifying query, or the like.

Thus, the present invention may provide the capability to know that a viewer began viewing a particular show at a certain time, and to know when a user began viewing a different page, or show, thereby providing knowledge of how long a particular viewer spent on a particular page. Such knowledge is not available in the prior art, and the provision of such knowledge by the present invention allows for an increasing scale of payments for advertising displayed on a given page correspondent to how long a viewer or viewers remain, or typically remain, on that particular page or like pages. Thus, the tabular tracking of the present invention allows for the knowledge of how long viewer spends on a page, what the viewer was viewing or listening to on the given page, the ads shown while the viewer was viewing or listening, how long the ads were shown, and what ads were shown to the view correspondent to that viewer's identification and/or login. Thus, the platform of the present invention interrelates content and advertising shown to a user to that particular user's interest and the time spent investigating those interests, thus allowing for an increased targeting for advertisement and improvement in stimulation of desired site traffic.

In further exemplary embodiments, specialized content, such as RSS feeds, may be provided, Such RSS feeds may be selected from news, audio, and video, may be provided as content to a viewer or listener. The allowance by the present invention for the provision of RSS feeds allows for a user of the present invention to set up a specialized channel for that user, wherein the specialized channel may include certain content in the form of RSS feeds for that user at particular times and/or on particular days. Thus, particular users can subsequently publish their respective channels for use by other users. Of course, in order to allow for a user to set up channels based on RSS feeds, the RSS feeds selected by the users must be linked to across the world wide web and must remain live for as long as they are in use by a user. Thus, the present invention may provide a database of RSS feeds used across the web and linked to by the platform of the present invention. The present invention may further check to ensure that each RSS feed in the database of the present invention is alive, wherein such checking is performed at a particular time frame, such as every 8 hours. Thus, the present invention provides a content table of linked-to, ensured-live RSS feeds, wherein the RSS links may be archived, such as at predetermined archival time frames, along with all metadata related thereto, and wherein new metadata and RSS feed links may be continuously added to the present invention, either as they are used by users, or as they become available for use by users, or as they are located via, for example, crawling.

Figure 4:
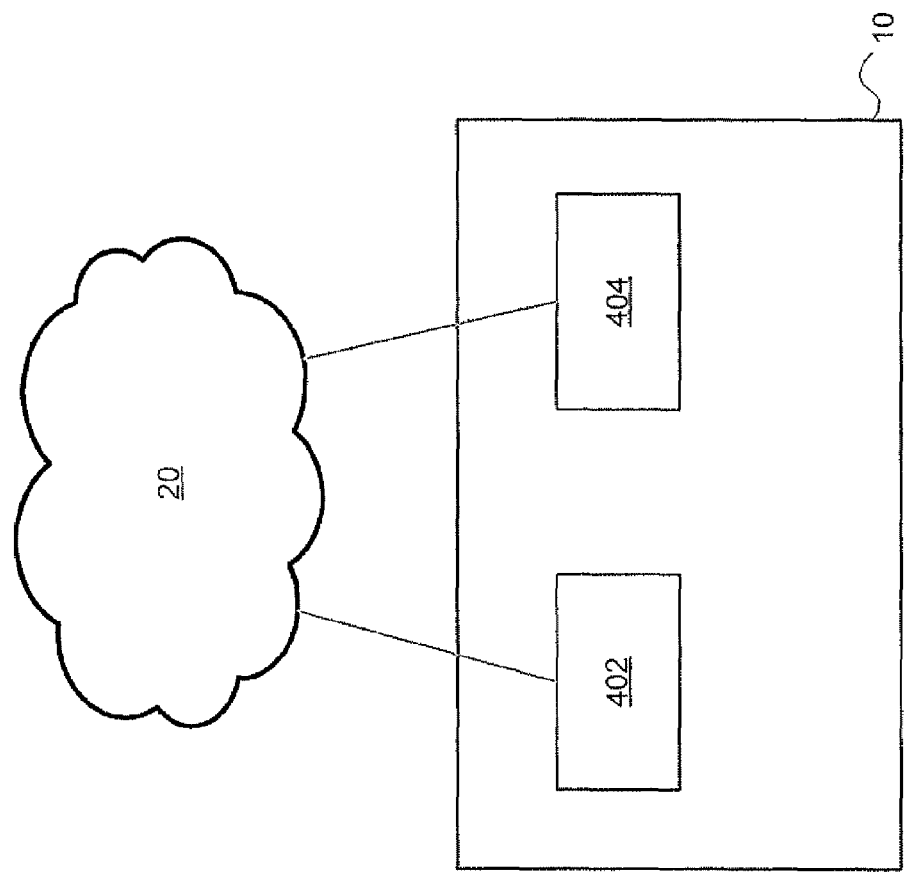
FIG. 4 illustrates an aspect of the present invention.

In other words, the platform of the present invention may query certain subsets of, or all crawled, RSS feeds and, if satisfactory to all involved parties, can upload the RSS feed, a link thereto, or the like. The RSS feed or link may then be continuously queried, and either disabled in the event that the feed is removed, maintained as available, or downloaded as new content when new content is added via the feed. This link and content validation service 402, along with the RSS feed and link content crawler 404, are illustrated in FIG. 4. Similarly, the present invention may provide content crawling and validation services for any web based video, audio or data, such as wherein a video is taken down and a link thereby disabled, or a new video link is added to an existing video link, the content reflected as being associated with the video link is updated.

It almost goes without saying, particularly in light of the disclosure hereinabove, that the content provided in accordance with the platform of the present invention may be presented, accessed, and/or stored as divided into multiple categories, wherein such content can be filtered by category, keyword, or the like. Thus, the platform of the present invention may additionally include a search interface, wherein a user can search available content, and/or all web-based content associated with a category or key word. Further, known methodologies may be used to "link" users viewing a show at different start times to temporally allow for commenting, questions, and the like, such as that in the aforementioned secondary windows, to be viewed by each viewer at the relevant point in the viewing of the content within each category.

With regard to the advertising aspect of the present invention, the advertising is, as discussed hereinabove, intertwined with the content generated and/or presented in accordance with the present invention. Myriad methodologies are available for the placement of relevant advertising on a web page, as are available myriad methodologies by which advertisers pay for advertisements on a web page, as will be understood by those of skill in the art. For example, certain ad servers select an advertisement for placement by searching the text of a page for certain key words, others read an entire page, such as the nouns present on a page, and compare this full read against a keyword database, and some prioritize certain pages based on a number of factors, such as frequency of modification, in order to assess the frequency at which such pages should be crawled to decide upon relevant advertising information.

The advertising engine of the present invention accounts for the myriad methodologies for placing relevant advertising and enables the optimization of advertisement relevance, thereby providing for increased desired action responsive to the advertisements placed in accordance with the present invention. The different response actions to a placed advertisement include the known different revenue sources for the placement of advertisements, namely pay per action, pay per click, and pay per display, wherein variations within each revenue model are available, such as wherein, within a pay-per-action model, sales leads are assessed, which sales leads may include purchases, redirects, redirects to affiliate networks, link sharing, and the like.

Figure 5:
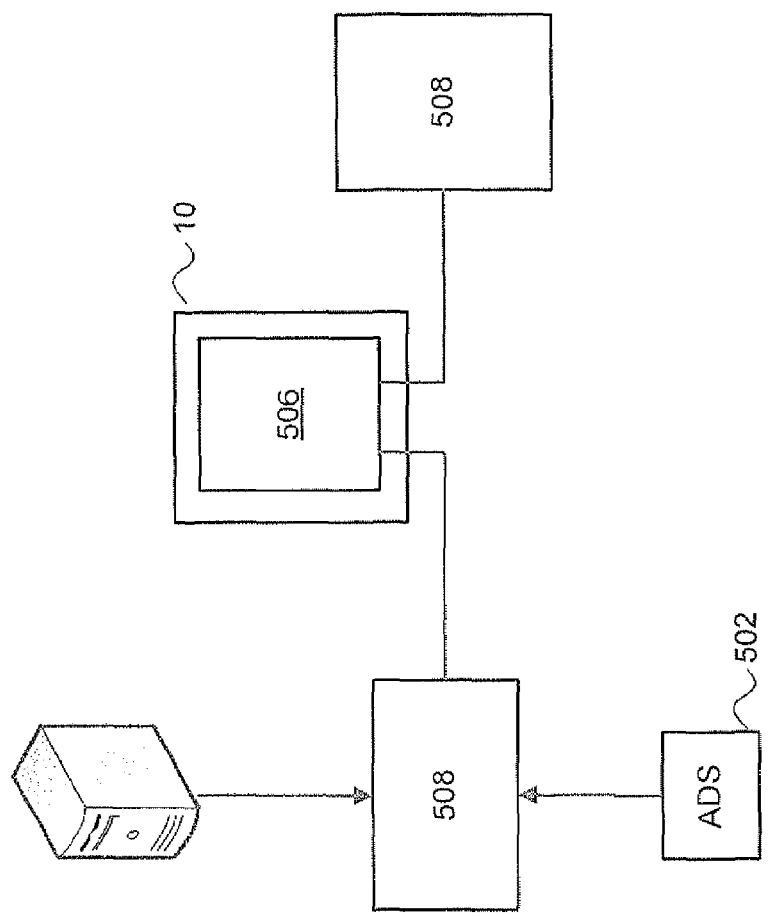
FIG. 5 illustrates an aspect of the present invention.

In an additional exemplary embodiment, FIG. 5 illustrates the entry of advertisements for advertisers presented as relevant to a user of the platform of the present invention 502 into one or more of the categories mentioned above with regard to content, such as thirty-five categories with regard to content, for provision in those categories by one or more advertisement servers 24. Such an advertisement server can typically accept an ad from within the server itself and/or from within its storage capabilities, or can access an external ad via a link or like parameter entered to the advertisement server. For example, if the advertisement server approves the access by an external interface 506, such as the ad interface provided in the present invention, and approves the advertisements made available by, from or to the interface, the interface interfaces to a web page. Upon loading of a web page 508, for example, regions are displayed on the web page into which the advertisements are placed upon approved production from the advertisement server. In a typical embodiment, the larger the region on the web page, the more money is paid by the advertisers to place an advertisement in that region.

Figure 6:
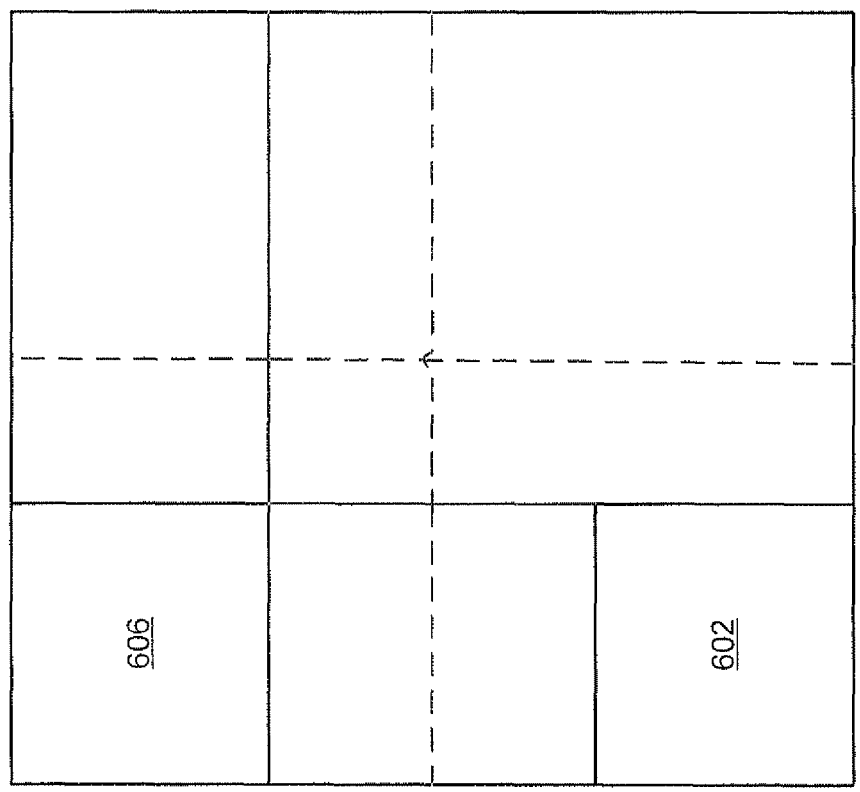
FIG. 6 illustrates an of the present invention.

FIG. 6 illustrates a web page displaying advertisements in accordance with an exemplary embodiment of the present invention. Of note, because of the generally long visit times per page in accordance with the improved content, and stimulated traffic seeking that improved content, as discussed hereinthroughout, the present invention may rotate advertisements during a page view, and/or charge extra to advertisers for access to viewers for such extensive periods of time. Further, such long visitor times lead to improved desired user response to advertisement placement, such as improved click through on pay per click ads, as previously discussed hereinabove.

As illustrated in FIG. 6, and in accordance with the present invention, it may be typical that pay-per-action advertising works best in the lower left hand region of the page view 602. It is further typical of the present invention that pay-per-click advertisements work best in the upper left hand region of a page view 606. Needless to say, the ad placement may be modified and still be in accordance with the present invention. It is noted that, particularly with regard to pay-per-click advertising, the present invention provides a significant increase in success rate of such advertisement, which is due, in part, to the increased visitation time for a typical viewer of a typical web page in accordance with the present invention. It is necessarily the case that, in light of the increased success rate of pay-per-click advertising due to the increased view length of a typical page view provided by the present invention, other advertisement revenue models also experience improved responses based on the increased length of typical visitation time in accordance with the present invention.

Thus, the present invention is capable of providing optimized advertising, both by type, page region, obtained viewer response, and length of view. Further, as referenced above, due to increased length in page views in the instant invention, certain advertisements may be changed at a certain predetermined time period, or upon occurrence of a certain event, such as one set of advertisements being displayed pre-broadcast, one set during broadcast, and one set post-broadcast. Of course, those skilled in the art will appreciate that such advertisements may not only change over time, but may in fact be of different types, such as audio, video, pictorial, sponsored, and the like.

Further, in accordance with continuous updating of new content in the present invention, and the availability of indexes of pages in accordance with the databases referenced hereinabove, the relevance of advertisements, such as those illustrated in FIG. 6, placed on a given page view may necessarily increase over time, in part because a continuous updating or reinstantiating of such pages causes a continual relevance crawl of each page by certain advertising servers. Thus, pages may be updated and/or re-instantiated to increase relevance of selected advertisements for that page with each subsequent crawl, such as by an engine that increases relevance over time. Such re-instantiation may be at the request of a consumer, at the request of a timer, at the request of an advertiser, at the request of an advertising server, at the direction of one or more aspects of the present invention, such as the relevancy increasing engine, or at any time a page, content, or content link is updated by the present invention or by a third party. Such updating and/or re-instantiation may be, or be associated with, the page, link or feed checking and/or verifying discussed hereinthroughout.

Needless to say, such a relevance crawl, such as by one or more advertising servers, may ignore, or be forced to ignore such as by blanking out or not filling fields, words or fields not necessarily relevant to advertisements placed. Such non-relevant fields in the present invention may be any terms, metatags, data or the like in a secondary window and/or in an existing advertisement or text advertisement.

Thus, in accordance with the present invention, typical advertisement restrictions may no longer be in place. For example, the relationship of the content to the relevance of the advertising place may allow for content related to one competitor to be in view, while advertisements related to a second competitor are simultaneously in view, in accordance with the present invention.

The present invention may also allow for tracking of demographics, geography and page viewing time per user or per page visitor. Tracking may be accomplished through user designated information or the querying of user information from the user him/herself. Yet another dimension of tracking may also include the tracking of web page interaction. More specifically, the interaction with advertisements can be tracked. Tracking thus includes not only monitoring of click throughs, but also of pass overs and of post click through activities. This type of tracking allows for the assigning of attributes to users and may enhance the value of ads by combining the user data with actual, real-time use information. The tracking may further include information related to the post click through activities by following the user's activities through the posted ad to the advertiser. These additional dynamic use attributes may be correlated with the standard user attributes to create a more defined and optimized user and ad targeting profile.

This type of dynamic data collection allows for not only a more optimized and value added store of user attributes, but allows for the application of various revenue generating models. These models include pay per action, pay per click, and/or pay per display. Each of these models can be used per the advertiser's preference or mixed and/or matched to optimize the attributes of the user.

Additionally, these models can be further mixed and matched with respect to location on the website itself. In an embodiment of the present invention, advertisements are paced on a web page to maximize the effectiveness of various revenue generating models. By way of non-limiting example only, the use of ads coupled with a pay per click model may generate more clicks, i.e. revenue, when placed at the top third of a web page versus being placed in the bottom third of the web page. Similarly, the pay per display model may work best at the bottom third of the page versus the top third. Although these conventions may be generally true for the average user, such conventions may be further optimized based on individual user attributes.

In an embodiment of the present invention, an ad server may select an advertisement stored locally or from a remote site. Available advertisements may each have available to them a set of attributes which may correspond to the available pages and users of the system. At least one ad server may select an advertisement for placement by searching the text of a page for certain key words, others may read an entire page, such as the nouns present on a page, and compare this full read against a keyword database, and some may prioritize certain pages based on a number of factors, such as frequency of modification, in order to assess the frequency at which such pages should be crawled to decide upon relevant advertising information.

An ad server may also utilize a recommendation engine suitable for making available for use ads which most favorably correlate with a specific user and/or web page. The recommendation may also provide limitations on what advertisements are made available to certain web pages and/or users based on specific criteria. By way of non-limiting example only, a user may specify an interest in sports and may be limited to sports related advertising. Similarly, a user may have attributed to them an interest in cooking through tracking as described above and may thus be provided with only ads focused on cooking. This type of dynamic correlation creates a very focused and valuable user-ad interaction. This may also allow the present invention to further more precisely value the available advertising regions of the viewed web page as discussed herein throughout.

As discussed above, in an embodiment of the present invention, advertisements may rotate during a page view. This rotation may be optimized to correlate with the amount of time the user is viewing the subject web page. The rotation may be based on segments of time further based on the estimated or actual viewing time by the users. The rotation may also be based on user attributes which may demonstrate a particular user's penchant for clicking on ads given a particular rotation time. By way of non-limiting example only, a particular user may click on an ad more often when it first becomes available through rotation rather than ads that were/are made available or presented upon the initial viewing of the page. In this way, initially quick ad rotation may have greater click-through success than originally placed or more stagnant advertisements. Advertisement rotations may be made in minute intervals, or may be less than several seconds, depending on the correlations made by the recommendation engine.

In an embodiment of the present invention, pre-roll and post-roll media may be made available for viewing and downloading. Such media may also include digital rights management software along with associated advertisements. The present invention may allow for the management of the digital rights management software as well as provide for the tracking of usage of the media. In this way, the present invention may allow for the tracking of views of the advertisements associated with downstream and post-downloaded usage of media with embedded advertisements allowing for the valuing of such media and the individual advertisements contained therein. This type of continuous and dynamic tracking allows the present invention to value and charge advertisers for not only the views that actually occur with the media provided, but also charge additional fees based on enhanced user attributes which take into account what the user is watching/viewing when not presently engaged on a subject web page.

As discussed hereinthoughout, an embodiment of the present invention may track the time, placement, and activity of an advertisement. These values may be further correlated against users and kept to further to track viewing and activity to correlate and predict the value of current and potential ads. Tracking may also include correlation to user attributes to facilitate information useful to third parties in connection with future sales. By way of non-limiting example only, information may be provided to third parties on user habits and historical and potential use(s) to facilitate sales leads and/or ancillary sales contacts whether through further ad placement on the viewed site, or more likely, through direct third party to user contact via email or other avenues as those skilled in the art would utilize.

The final interconnective aspect of the present invention illustrated in FIG. 1 is traffic. In part because, as mentioned hereinabove, there is an awareness of when a user of the present invention logs in accordance with the present invention, and in part because prior use by each user may be tracked by a tabular tracking in accordance with the present invention, traffic in the platform of the present invention allows for advertisements relevant not only to the user's present use, but additionally to the user's prior uses.

Further, as discussed hereinabove, there is an awareness as a user watches and/or updates a show, at least by virtue of the fact that there is an awareness that user is still active on a timer correspondent to the page then in view. Consequently, it is known when the user leaves the page of view, and perhaps to where the user went. As such, the length of time traffic spends in a given page is known in accordance with the present invention and may be tabularly tracked, and additionally, desired advertisement responses may correspondingly be tracked, such as knowing when a web page is clicked through to in accordance with a pay-per-click advertisement. Additionally, the personal RSS feed and/or RSS metadata correspondent to an individual user's channel may, as previously discussed, allow for a user to host his or her channel, which may be subsequently shared with other users. Thus, advertising revenue can be shared in the present invention in accordance with all users of such a personal channel on the platform of the present invention, as well as all users to whom such a channel is forwarded.

Additionally, with respect to traffic, a show setup wizard, and/or a channel setup wizard, may be provided by the platform of the present invention in order to improve generation or organization of relevant or desired content, which content thereby increases traffic from among those who consider that content relevant or desired. Thus, shows and channels may be set up in any way desired by a particular user, such as to limit, access, or stimulate only certain users and/or certain types of traffic, such as only allowing users to access a particular show who are invited to that particular show, or only allowing users who meet certain criteria to access a particular show or channel.

Figure 7:
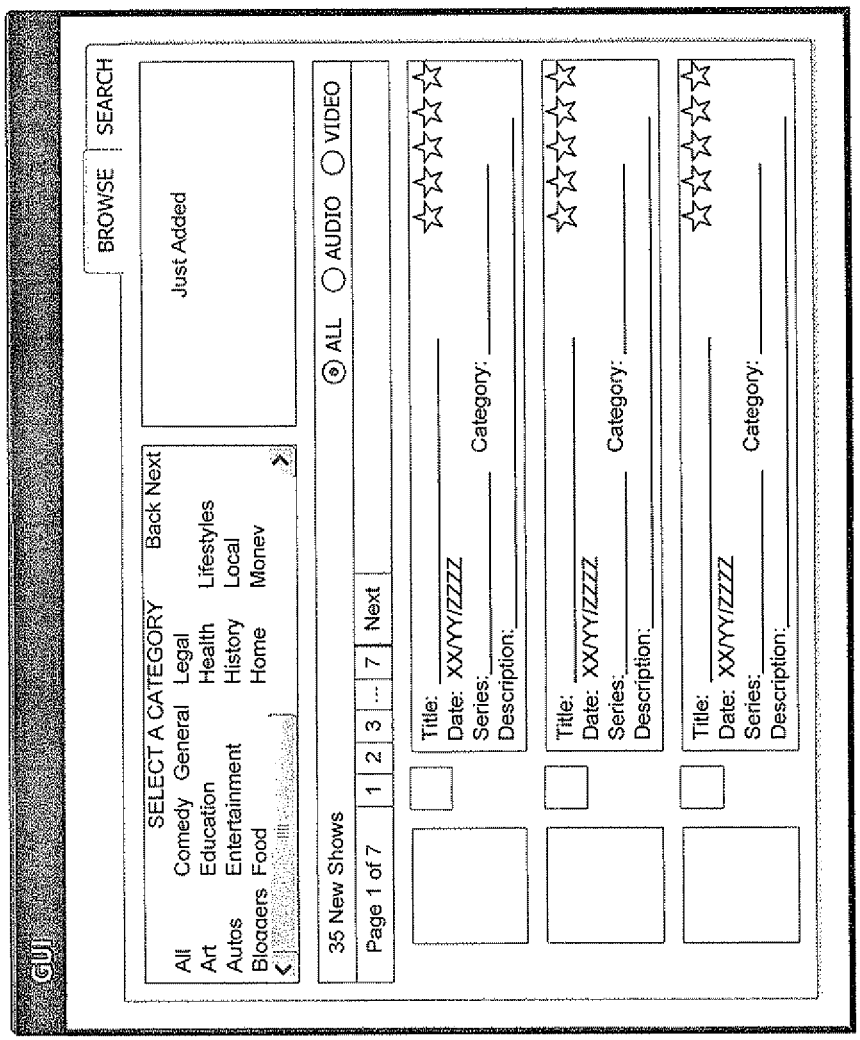
FIG. 7 illustrates an electronic document according to an embodiment of the present invention.

FIGS. 7-10 are illustrative of an exemplary embodiment of the present invention as described hereinabove with respect to FIGS. 1-6. FIG. 7 illustrates a base screen for viewing content in accordance with the present invention. As illustrated, the invention may provide a user with access to content in the form of graphic, audio, or video content, such as pre-recorded "podcasts", audio, video, and the like. Similarly, as discussed hereinabove, such content may be made available as it is created, such as in a dial-out, dial-in, or invitation embodiment. Content may be made available via a menu-based, linked-based, drop down based, or like system, in which a user can select content of any of a given number of types, such as new content, recently-added content, current live-generated content (content then employing a dial-in or dial out system), most popular content, and the like. As referenced hereinabove, the capability of the present invention to monitor the content viewed by each user, and hence by all users, and the amount of time such content is viewed by each user, may allow for an improved prediction of "most popular" content in the present invention over such predictions available in the prior art Additionally, the classification of content as "most popular" in the present invention allows for increased advertising revenue in the present invention based on keying of advertisements to the most popular content, particularly in embodiments wherein such advertising is keyed to the most popular content by category, wherein the category of the "most popular" content matches the category of the advertising, as discussed further hereinthroughout.

Content may be thus made available by selectable category, Such categories may include content categorized based on any methodology, such as by division into those categories illustrated in FIG. 7, Further, upon selection of a display type and/or category, available content may be displayed with summarizing information, such as content summary, date, rating (either by users or host application service, for example), contributor, if applicable, series in which the content falls, if applicable, number of current users viewing/listening to that content, number of total users viewing/listening to that content, and the like, Further, not only may content be viewed/heard, categorically or otherwise, from a main selection screen, but similarly other users may be invited by the current user/viewer listener to view/hear content from this screen, such as via email, telephonic bridge, and/or instant messaging, as discussed hereinabove.

Further, as illustrated in FIG. 7, content, or links to content, may be added to the hosted application service for viewing/listening by other users. Such content may include audio or visual works, including podcasts, and/or links thereto, such links to RSS feeds or a user-created channel resident on the hosted application server. Such a user-created channel may include content selected by, and/or created by, a particular user. The selected content for such a user-created channel may be relevant to a preferred category of the selecting user, may be highly rated by the selecting user, may be most referred-to by other users, and the like, for example. Such user-created channels may be made available to all other system users, to only certain other users, and/or only to other users meeting certain registration or use criteria, for example.

Figure 8A:
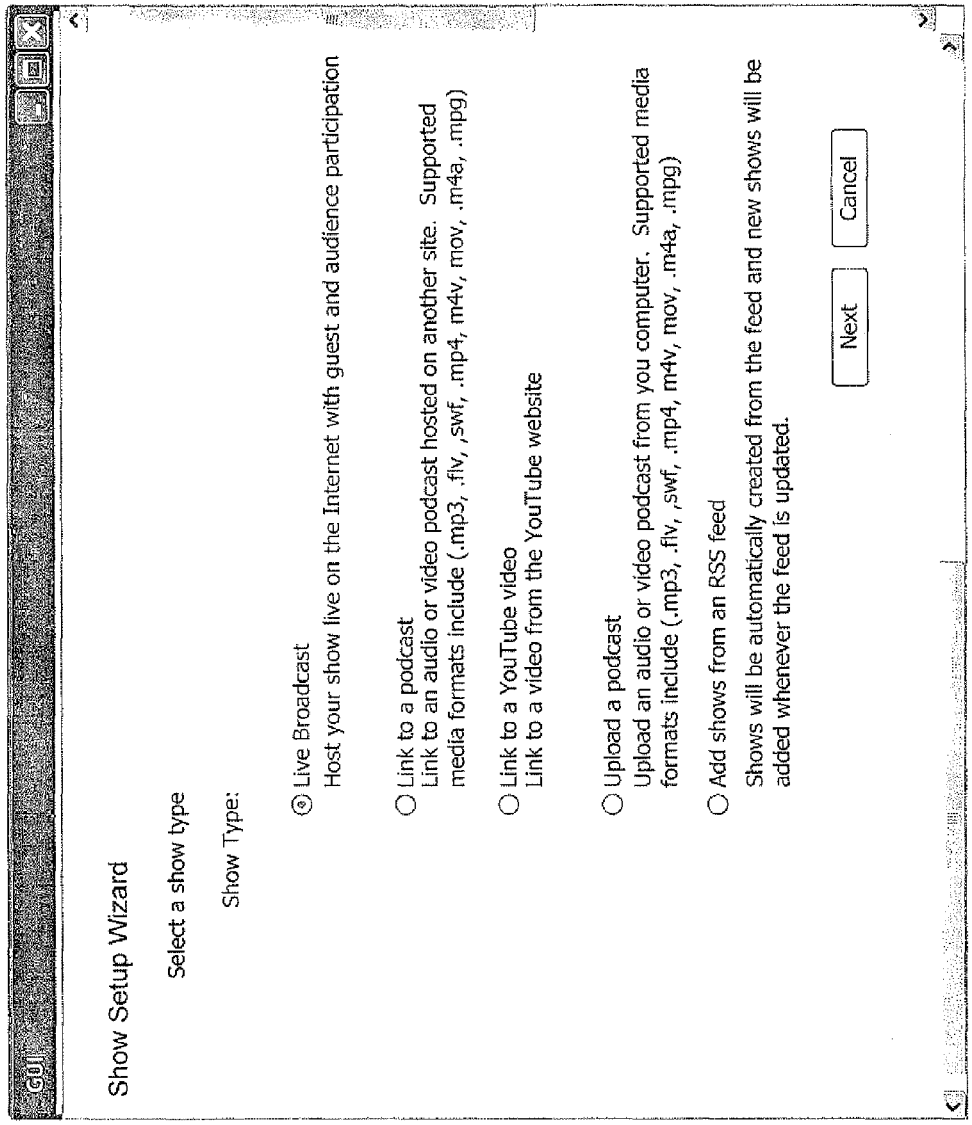
FIG. 8A illustrates an electronic document according to an embodiment of the present invention.
Figure 8B:
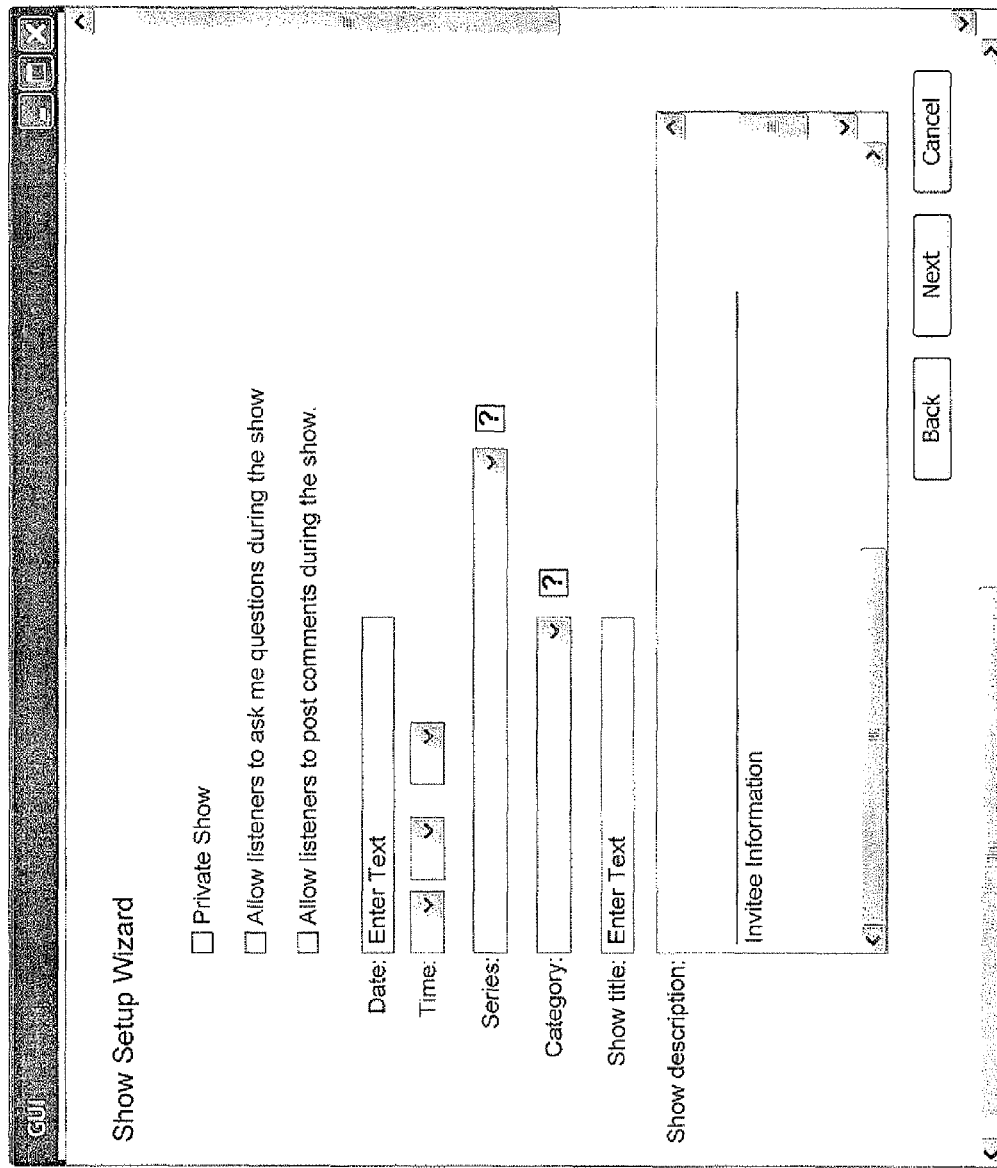
FIG. 8B illustrates an electronic document according to an embodiment of the present invention.

FIGS. 8A and 8B illustrate the exemplary embodiments, discussed hereinabove, in which a user can create content, and control or stimulate traffic by employing an invite, dial out to, or allowance for dial in by, target listeners/viewers. Further, in certain exemplary embodiments, such viewers/listeners can comment, question, or the like, in real time during the generation of the content, as discussed hereinthroughout.

Figure 9:
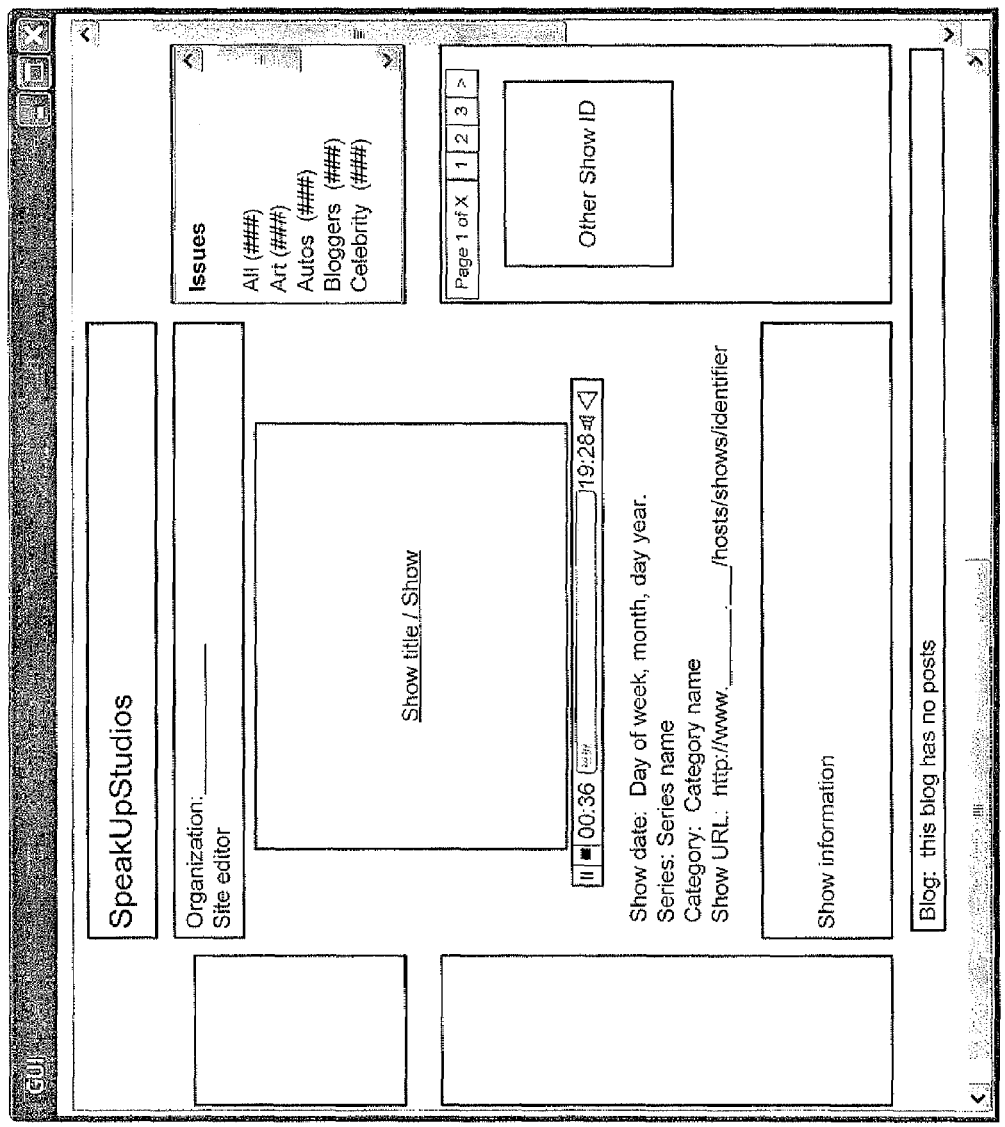
FIG. 9 illustrates an electronic document according to an embodiment of the present invention.

FIG. 9 illustrates the selection of a pre-recorded content program in accordance with the present invention. As illustrated, advertising may be presented adjacent to the selected content. Such advertising may be assessed as relevant to the content viewed/listened to, and/or may be assessed as relevant to the particular content-viewing user, such as based on the recorded viewing listening history of the user, as discussed hereinabove, and/or based on the personal information regarding the user, such as that recorded or entered into the user's profile, such as upon obtaining of an account by the user or thereafter, as illustrated in FIG. 10. Further, as shown, other content may be recommended to the user based on the user's selection of the content, thereby stimulating traffic, such as via display of other available content in the category selected, other newly available content, or the like, for example. Additionally, as illustrated, such content-viewing/listening environments may allow for simultaneous display of instant messaging, or blogging, relevant to the show then being viewed, further stimulating viewing and viewing time, of content in the present mention, and thus further stimulating traffic. Yet further, the validation of the pre-recorded content selected in accordance with the present exemplary embodiment, prior to the selection of that content by the viewer, insures that the viewer will not access dead, old, or unupdated links, thereby increasing desire to view and thus stimulating traffic.

Many methodologies of increasing traffic may be utilized in the present invention. For example, the present invention offers free, original, and quality content on the website. The present invention is created in part under the belief that traffic is created by offering users something that may not be obtained elsewhere. This may take the form of content, quality or cost. Generally speaking, content that is designed to achieve a goal, solve problems, provide entertainment, provide information may most often be sought. In addition, the temporal nature of the content may also drive traffic. The present invention is created in part to provide regular temporal updates, thus improving the temporal nature of content in the present invention.

The present invention provides a full featured "on demand" software and media communications platform that serves both enterprise customers and consumers. This allows for rapid building of branded social media channels and communication solutions around interactive audio and video broadcasting, desktop sharing, chat and SMS text messaging. Such services may be embedded directly into the Internet experience in both desktops and mobile devices in the present invention. The present system builds these branded social media channels on a common platform and matches content and advertising engines with traffic from key partners. All of the above increases the desirability of viewing. Additionally, the content crawler of the present invention automatically locates new content across the Internet, catalogs it and delivers it to targeted viewers on demand. This lets viewers select their own areas of interest and lets them interact with other people with similar interests.

Further, by way of another non-limiting example, improving search engine ranking also may have a direct effect on the stimulation of traffic in accordance with the present invention. More specifically, in addition to making better use of keywords and having those keywords more naturally relate to the content and text of the system, the present system may further launch website pages associated with searched content.

Further, in accordance with continuous updating of new content in the present invention, and the availability of indexes of pages in accordance with the databases referenced hereinabove, the relevance of advertisements, such as those illustrated in FIG. 3, placed on a given page view may necessarily increase over time, in part because a continuous updating or reinstantiating of such pages causes a continual relevance crawl of each page by certain advertising servers. Such improved relevance may further improve the desirability of viewing, and as such may also serve to drive traffic. Pages may be updated and/or re-instantiated to increase relevance of selected advertisements for a page with each subsequent crawl, such as by an engine that increases relevance over time. Such re-instantiation may be at the request of a consumer, at the request of a timer, at the request of an advertiser, at the request of an advertising server, at the direction of one or more aspects of the present invention, such as the relevancy increasing engine, or at any time a page, content, or content link is updated by the present invention or by a third party. Such updating and/or re-instantiation may be, or be associated with, the page, link or feed checking and/or verifying discussed herein throughout.

Needless to say, such a relevance crawl, such as by one or more advertising servers, may ignore, or be forced to ignore such as by blanking out or not filling fields, words or fields not necessarily relevant to advertisements placed. Such non-relevant fields in the present invention may be any terms, metatags, data or the like in a secondary window and/or in an existing advertisement or text advertisement Such relevance of advertising based on a crawl not dedicated to extraneous factors, but rather dedicated to desired content, may, yet again, increase desirability of viewing, and may thus drive traffic.

Thus, in accordance with the present invention, typical advertisement restrictions may no longer be in place. For example, the relationship of the content to the relevance of the advertising place may allow for content related to one competitor to be in view, while advertisements related to a second competitor are simultaneously in view, in accordance with the present invention. Needless to say, the availability, not present in the prior art but provided by the present invention, for a viewer to be able to compare offerings, statements or ads from multiple competitive entities relevant to the viewer's content viewing history improves a viewer's ability to select the best offering for that viewer without changing to a different web page, thus again stimulating traffic in the present invention by increasing the desirability for viewership.

According to an aspect of the present invention, the present platform includes internet radio and television brands around audio and video broadcasting content. Each brand is focused on a specific targeted audience, such as politics, religion, home & garden, family, action sports, entertainment and healthcare. The present invention may include advertising and content delivery platform to enable content engines to bring our media to web sites that have existing visitor traffic, or use traffic engines to bring visitors to sites with unique, focused content, or both, and partner with them to monetize the visitors. Adding live communications to these sites encourages visitors to participate, which enriches their experience, increases the time spent per visit, increases the advertising yield per visit, and encourages their return to the site.

The content of the present invention may include media content and personal internet radio and television broadcasting to serve consumers in the social marketplace by partnering with web sites that have specific vertical focus and established passionate audiences. Additionally, the content engine of the present invention may automatically gather free media from across the Internet, match it to a related passionate audience, and generate new traffic from it, without human intervention.

As is known to those possessing an ordinary skill in the pertinent arts, in the prior art websites are trying to keep audiences engaged by adding audio and video, yet those viewing a particular clip are isolated from others, with similar interest's, who may also be present on the website—that is, visitors may not interact, or socialize, and share the media experience with others in real time, as they would in real life. The content of the present invention may provide opportunity for such interaction unavailable in the prior art. In particular, there are myriad newly created social network sites where the members are passionate around specific subject matter, such as food, travel, cooking, religion, children's health, retirement, politics, by way of non-limiting examples only. There are literally thousands of topics and potential sites, representing ideal markets for highly targeted audio/video content, especially when the related advertising revenue and added ability for the members to communicate directly with others of similar interest is included. In this environment, every ad could be relevant, causing the response rates to significantly exceed present norms. The present system may enable live communications between web site visitors. By enhancing any web site with the full breadth of real-time interaction and by stimulation of the real-life experience, particularly around people with common interests, an increase in recurring visits and lengthened time spent per page may occur. This drives earnings and builds brand awareness. The present invention, with its depth of media content, advertising and traffic engines, and communication tools, makes every existing and prospective social network a potential customer/partner.

The present invention may position advertising content engines to create new revenue from highly relevant ads delivered to specific targeted audiences. The present invention may repurpose rich media content for different market segments, deliver highly relevant advertising, and brand the platform for segmented internet radio and television broadcasting to provide efficiency to its present and prospective client/user base.

Other techniques may also be employed to drive traffic, such as free giveaways, and other techniques to attract consumer/user attention. These techniques are well known to those possessing an ordinary skill in the advertising arts. Additionally, individual or personal RSS feeds, such as a personal channel, for example, may be utilized to provide richer individualized content.

Traffic may also be increased by targeting keywords in order to remain in top three hits in searchable websites. This technique may be used by targeting the proper keywords. Placing such keywords in the title tags, meta tags and the like, as well as increasing the density of keywords on the website, may increase the ranking on search sites. Further, this may be carried to targeting traffic as well, such as by choosing keywords that are among the more searched keywords on the web. Often these keywords may be directed to a lower value Google value, but the number of hits will be significantly higher, and therefore traffic may be increased. This is done as set forth herein, and by targeting keywords that users of the internet actually search for. This necessarily means that the content offered from the website of the present invention is preferably properly categorized and is in demand by viewers.

Additionally, by folding content back to places from which the content came, partnering with other websites, and sharing revenue with other sites, such as, for example, by sharing 15-25% of ad revenue, traffic may be greatly enhanced. Further, by combining the advertising and content engines and/or integrating communication tools, compelling revenue sharing opportunities may be offered to websites who want to increase the yields from their existing web traffic. Further, very short sales cycles may be realized in partnerships because it may be possible to offer a new recurring net revenue stream that requires little effort or capital on the part of the partner. Correspondingly, partnerships may share in new revenues that are derived from a unique combination of technologies, which deliver maximized relevant advertising with optimum page placement.

Figure 11:
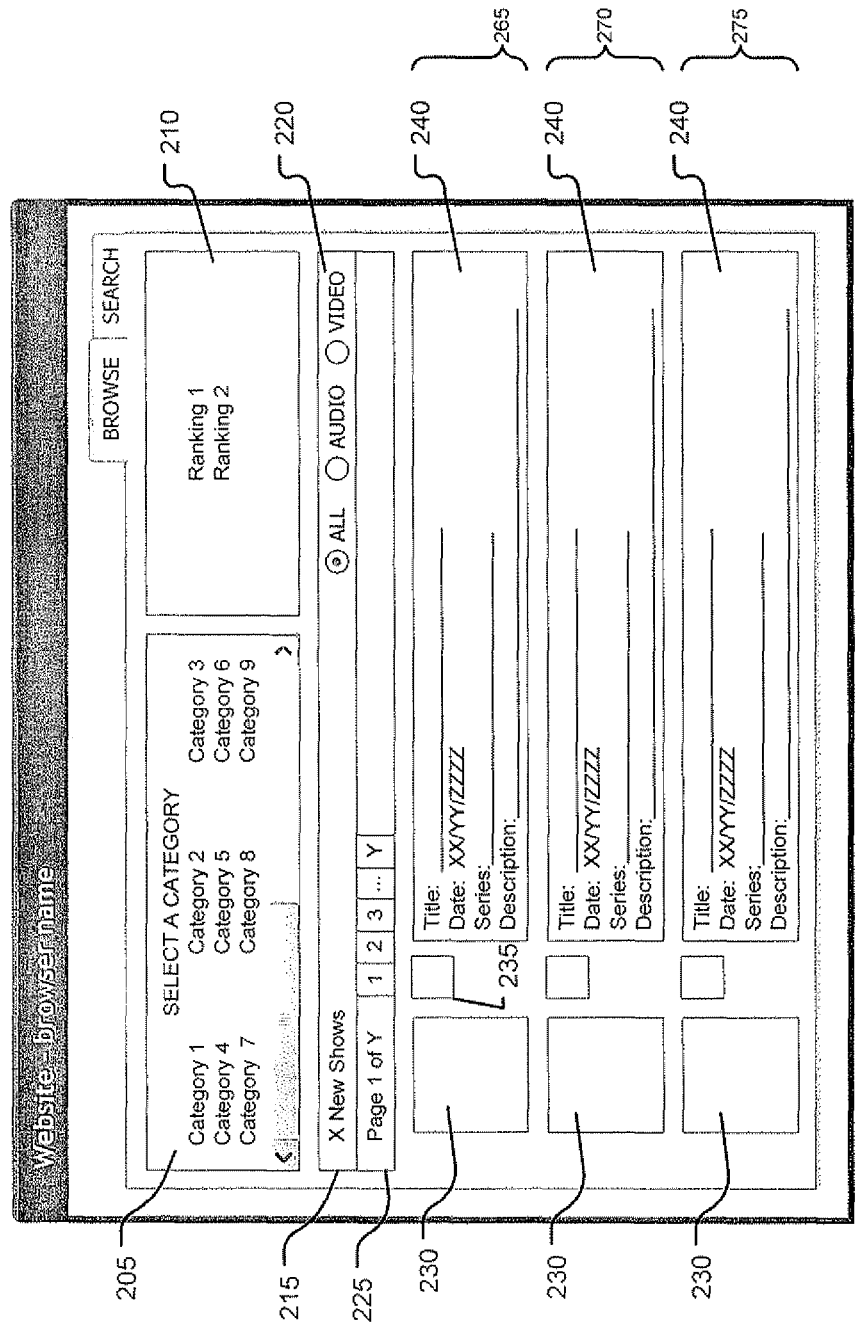
FIG. 11 illustrates an electronic document according to an embodiment of the present invention.

Referring now to FIG. 11, there is illustrated a web page 100 according to an embodiment of the present invention. Web page 100 may be provided to computers 20 by computers 30 via network 40. Illustrated web page 100 aggregates audio and/or video content for presentation to users of computers 20.

Referring still to FIG. 11, web page 200 includes a category selector 205, a ranking selector 210, a new content indicator 215, a content type indicator 220, a page selector 225, particular content graphics 230, particular content type indicators 235 and particular content information 240 organized under a tab 245.

Particular content graphics 230, particular content type indicators 235 and particular content information 240 are organized to indicate individual presentations. In the illustrated case, presentations 265, 270, 275, respectively. A user may have such indicated presentations made to them by selecting an individual presentation for streaming or downloading, such as by clicking on an indicator 235, 240 or 245. For non-limiting purposes of explanation, "streaming", as used herein, generally refers to a technique for transferring data such that it can be processed as a steady and continuous stream and a user's browser or plug-in can start presenting the data before the entire file has been transmitted. For non-limiting purposes of explanation, "downloading", as used herein, generally refers to a technique for transmitting data (e.g., an entire data file) between computers, such as between file server 36 (FIG. 1A) and a computing device 22 (FIG. 1A). In certain embodiments of the present invention, a commercially available content (e.g., audio and/or video podcast) delivery application, such as the Flash product available from Adobe Systems Inc., may be used to provide selected presentations to users' computers 20 (FIG. 1A).

Referring now to FIGS. 1A and 1, a user of a device 20 may request page 200 from content server 34 using a browser application in a conventional manner. Server 34 may provide page 200 to the requesting computer 20 in a conventional manner, optionally using database server 32 to populate page 200, for example.

In certain embodiments of the present invention) when a user selects a category in selector 205, content server 34 may request database server 32 identify which presentations should be used to populate page 200 according to the selected category. Server 34 may then provide such a populated page 200 to the requesting user computer 20. Examples of categories that may be included and selected using selector 205 include art, autos and vehicles, bloggers and people, celebrity gossip, comedy, education, gadgets, health, how to and DYI, legal, music, news, and pets and animals, for example. By selecting one of these categories, a user may receive pages 200 populated with content according to the selected category.

In certain embodiments of the present invention, when a user selects a ranking in indicator 210, content server 34 may request database server 32 identify which presentations should be used to populate page 200 according to the selected ranking. Server 34 may then provide such a populated page 200 to the requesting user computer 20. Examples of rankings that may be included and selected using indicator 210 include most recent presentations and most popular presentations, for example. By selecting one of these rankings, a user may receive pages 200 populated with content according to the selected ranking.

In certain embodiments of the presentation, a user may select a populated presentation (e.g., 265, 270 or 275, FIG. 11). In response thereto, server 34 may request file server 36 either stream or download the selected presentation to the requesting users computer 20.

Figure 12:
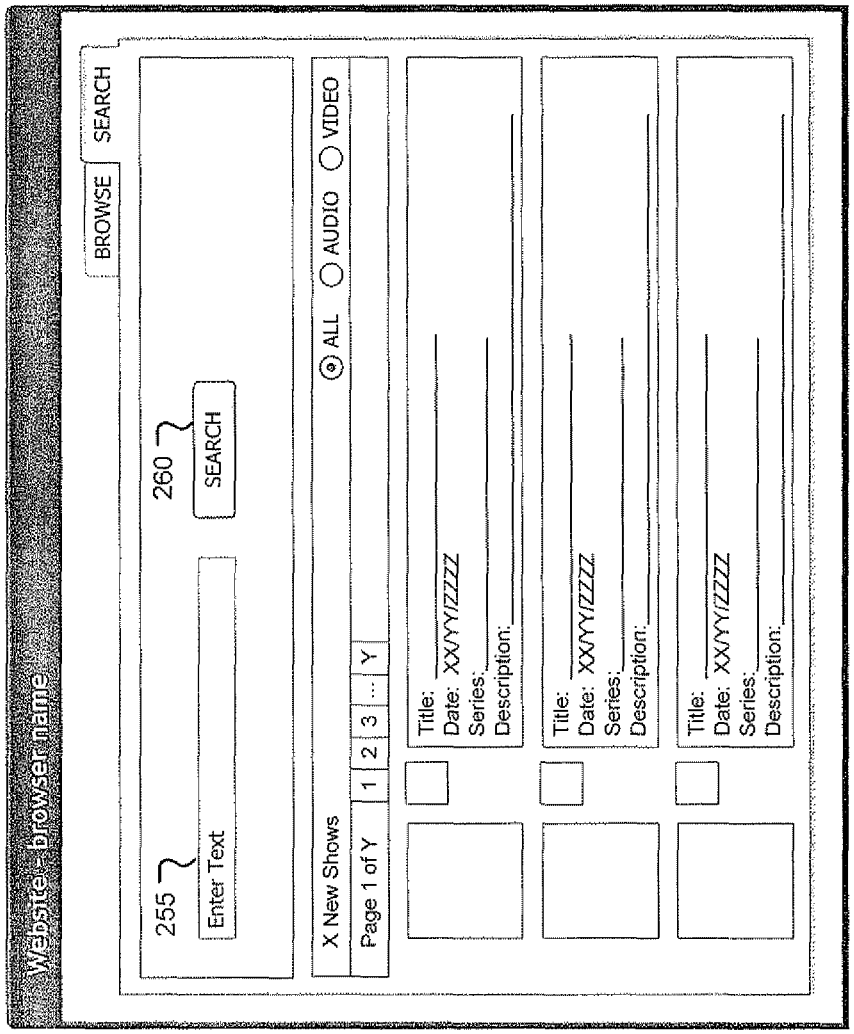
FIG. 12 illustrates an electronic document according to an embodiment of the present invention.

Referring now to FIG. 12, there is shown a view of web page 200 when tab 250 is selected. In the illustrated embodiment of FIG. 12, web page 200 includes a text box 255 and search button 260 under tab 250.

In certain embodiments of the present invention, when tab 250 is selected, text box 255 and search button 260 may be presented on the user's computer 20 by server 34. A user may enter a search term into window 255 in a conventional manner. A user may then activate search button 260 in a conventional manner. Responsively thereto, content server 34 may request database server 32 identify which presentations should be used to populate page 200 according to the entered search term(s). Server 34 may then provide such a populated page 200 to the requesting user computer 20.

As will be appreciated by those possessing an ordinary skill in the pertinent arts, there are a number of ways to aggregate and provide content for provision using web page 200.

In certain embodiments of the present invention, users may be permitted to directly upload and enter information regarding content, e.g., to file server 36 (FIG. 1A). In certain embodiments of the present invention, users may be permitted to link presentations housed elsewhere in memory so as to be accessible to a computer 20 (FIG. 1A) via network 40 (FIG. 1A)—essentially registering them with database server 32 (FIG. 1A). In certain embodiments of the present invention, presentations may be created using computers 20, 30. And, in certain embodiments of the present invention, presentations housed elsewhere in memory so as to be accessible to a computer 20 (FIG. 1A) via network 40 (FIG. 1A) may be automatically linked to—essentially registering them with database server 32 (FIG. 1A).

Figure 13:
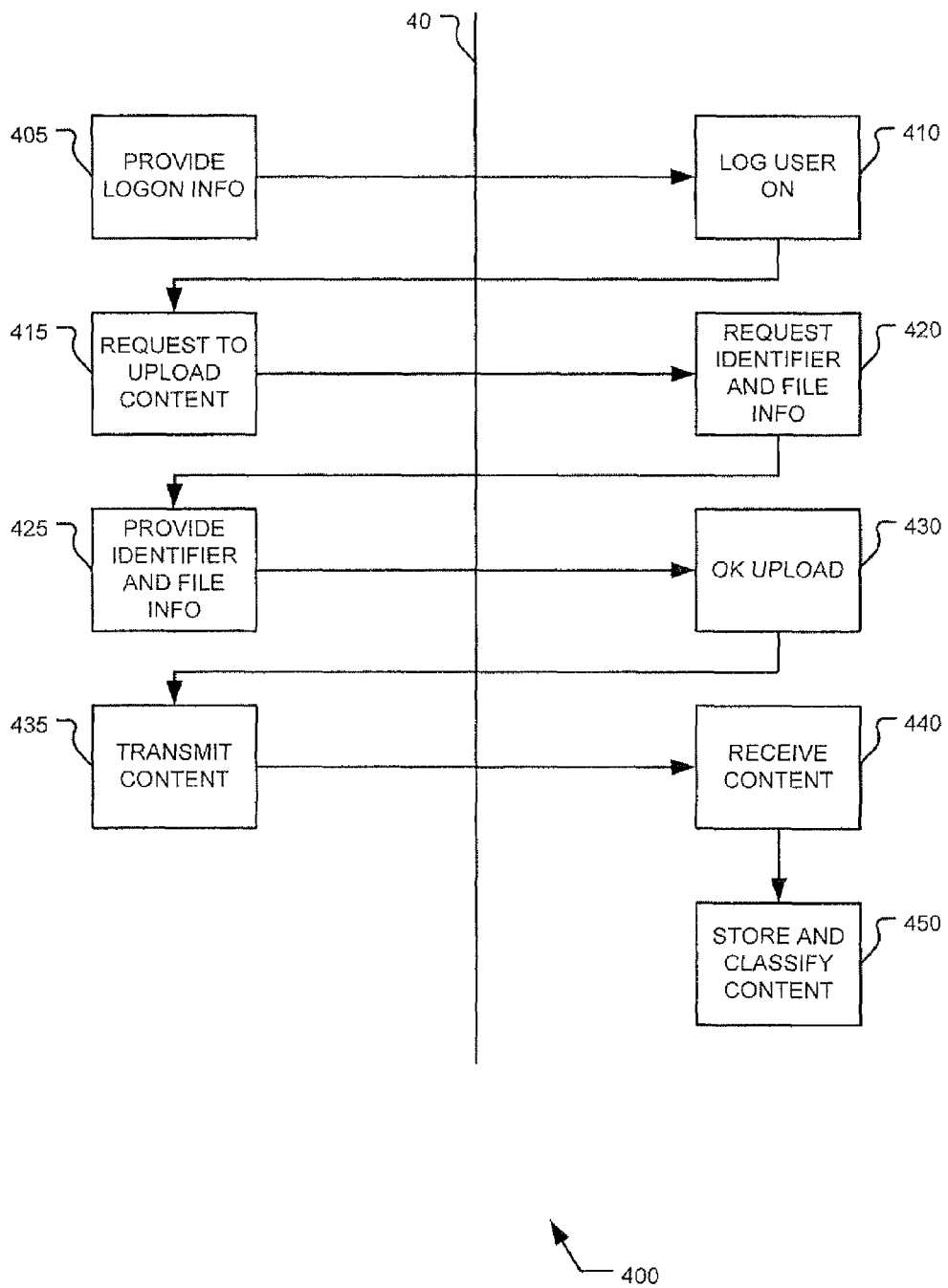
FIG. 13 illustrates a flow diagram of a process according to an embodiment of the present invention.

Referring now to FIGS. 1A and 13, there is shown a flow diagram of a process 400 according to an embodiment of the present invention. Process 400 is suitable for permitting users to directly upload and enter information regarding content. Process 400 commences with a user providing log on information using a computer 20 at block 405, which is provided to computers 30 via network 40, in certain embodiments to server 34. Computers 30 log the user on at block 410, and communicates this status to the user via network 40, in certain embodiments by serving a page 200 (FIGS. 11, 12) to the logged on user's computer 20.

At block 415, the logged on user requests to upload content, e.g., by interacting in a conventional manner with web page 200. This request is provided to computers 30 via network 40. At block 420, computers 30 request information regarding the content to be uploaded. In certain embodiments, the requested information may include a content title, date, series information and description, akin to that to be displayed in a corresponding indicator 240 (FIGS. 11, 12). The request may further include a file identifier and location of the content indicative file to ultimately be uploaded. This request may be communicated to the user's computer 20 via network 40.

At block 425, the user provides at least a portion of the requested information, which is communicated to computers 30 via network 40. Some or all of the information provided may be screened or filtered or verified by the validation at block 430. The validation engine, system and method (described in greater detail hereinbelow) may determine whether the particular content identifier and/or location are valid or invalid, updated or not updated, new or previously presented, and/or the like, and may consequently proceed only with validated content through process 400. As used herein, the term "validation" may include one or more assessments, as referenced hereinabove, that content is valid or invalid, updated or not updated, new or previously presented, and/or the like. In certain embodiments of the present invention, information provided at block 425 may be received and screened or filtered or verified at block 430 using web server 34. All or a portion of that information may then be stored using database server 32, for later use in populating web pages 200, for example.

At block 430, computers 30 indicate the received information has been validated by the validation 430, and, if valid, may be suitable for use, thereby confirming that the content may be uploaded. This indication is provided to the user's computer 20 via network 40. At block 435, the user's computer transmits the content to computers 30 via network 40, e.g., performs a file upload in a conventional manner. The content is received by computers 30 at block 440. In certain embodiments of the present invention, content transmitted and received at blocks 435, 440 may take the form of media file suitable for use as a podcast, for example. Such a file may be received by server 34 for example, and provided to server 36 for storage 450 and later retrieval for downloading and/or streaming pursuant to a user's interaction with webpage 200 (FIGS. 11, 12), for example. In such a case, server 32 may associate the stored content indicative information provided at block 425 with the file stored at block 450.

Figure 14:
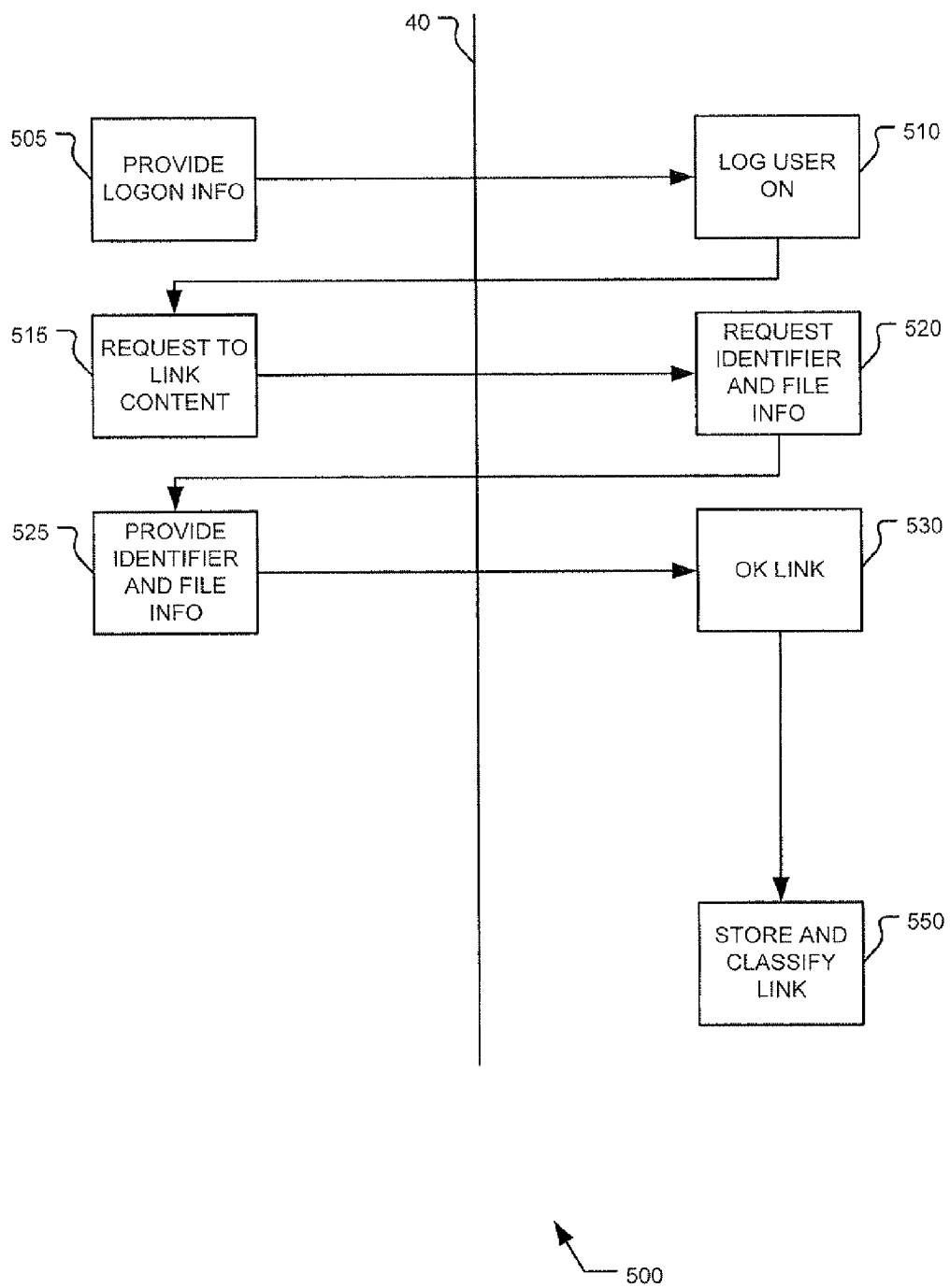
FIG. 14 illustrates a flow diagram of a process according to an embodiment of the present invention.

Referring now to FIGS. 1A and 14, there is shown a flow diagram of a process 500 according to an embodiment of the present invention. Process 500 is suitable for permitting users to link presentations housed elsewhere in memory so as to be accessible to a computer 20 via network 40.

Process 500 commences with a user providing log on information using a computer 20 at block 505, which is provided to computers 30 via network 40, in certain embodiments to server 34. Computers 30 log the user on at block 510, and communicates this status to the user via network 40, in certain embodiments by serving a page 200 (FIGS. 11, 12) to the logged on user's computer 20.

At block 515, the logged on user requests to link or register content, e.g., by interacting in a conventional manner with web page 200. This request is provided to computers 30 via network 40. At block 520, computers 30 request information regarding the content to be linked. In certain embodiments, the requested information may include a content title, date, series information and description, akin to that displayed in a corresponding indicator 240 (FIGS. 11, 12). The request may further include a file identifier and location of the content indicative file to be linked. This request may be communicated to the user's computer 20 via network 40.

At block 525, the user provides at least a portion of the requested information, which is communicated to computers 30 via network 40. Some or all of the information provided may be screened or filtered or verified by the validation at block 530. In certain embodiments of the present invention, information provided at block 525 may be received and screened or filtered or verified at block 530 using web server 34. In certain embodiments of the present invention, the file location data (e.g., an Internet address at which the file is available) may be checked to see if a valid media file is located thereat. All or a portion of that information may then be stored using database server 32, for later use in populating web pages 200, for example.

At block 530, computers 30 indicate the received information has been validated by the validation system, and, if valid, may be suitable for use and thereby confirming that the content may be linked. At block 550 the received information may be stored using server 32 for later retrieval and use. Server 32 may also associate the linked content indicative information provided at block 525 with the file address stored at block 550.

Certain embodiments of the present invention may provide the ability to track the number of visitors to the platform of the present invention, and additionally the number of visitors per content via the platform of the present invention. Further, the number of pages viewed by each visitor may additionally be tracked, such as in a tabular format, and such information may be continuously updated for as long as a user remains on a given page, that is, for as long as a user continues to watch a particular show. For example, it may be determined when a user begins and ends listening to and/or watching a presentation, e.g., a podcast, for example. Where a selected presentation is streamed from computers 30, such an inquiry may be relatively simple, by confirming the content streaming is progressing as expected, for example. Where content is housed elsewhere and linked to by computers 30, such a direct inquiry may not be readily available though. Such tracking may be performed, for example, via entry into one or more tables of database server 32 of timed data. At each expiration of the timer, such as every 15 seconds, a table entry may be made of the user, the page the user is on, and, to the extent the user is on the same page as was the user upon the last expiration of the timer, the user's total time, to the current time, spent on that same page. The user may be identified by, for example, any of a number of known methodologies, such as the information the user used to login, the user's IP address, the user's response to an identifying query, or the like.

Thus, certain embodiments of the present invention provide the capability to know that a viewer began viewing a particular show at a certain time, and to know when a user began viewing a different page, or show, thereby providing knowledge of how long a particular viewer spent on a particular page. Such knowledge is not conventionally available, and the provision of such knowledge by certain embodiments of the present invention allows for an increasing scale of payments for advertising displayed on a given page correspondent to how long a viewer or viewers remain, or typically remain, on that particular page or like pages. Thus, the tabular tracking of the present invention allows for the knowledge of how long viewer spends on a page, what the viewer was viewing or listening to on the given page, the ads shown while the viewer was viewing or listening, how long the ads were shown, and what ads were shown to the view correspondent to that viewer's identification and/or login.

Figure 15:
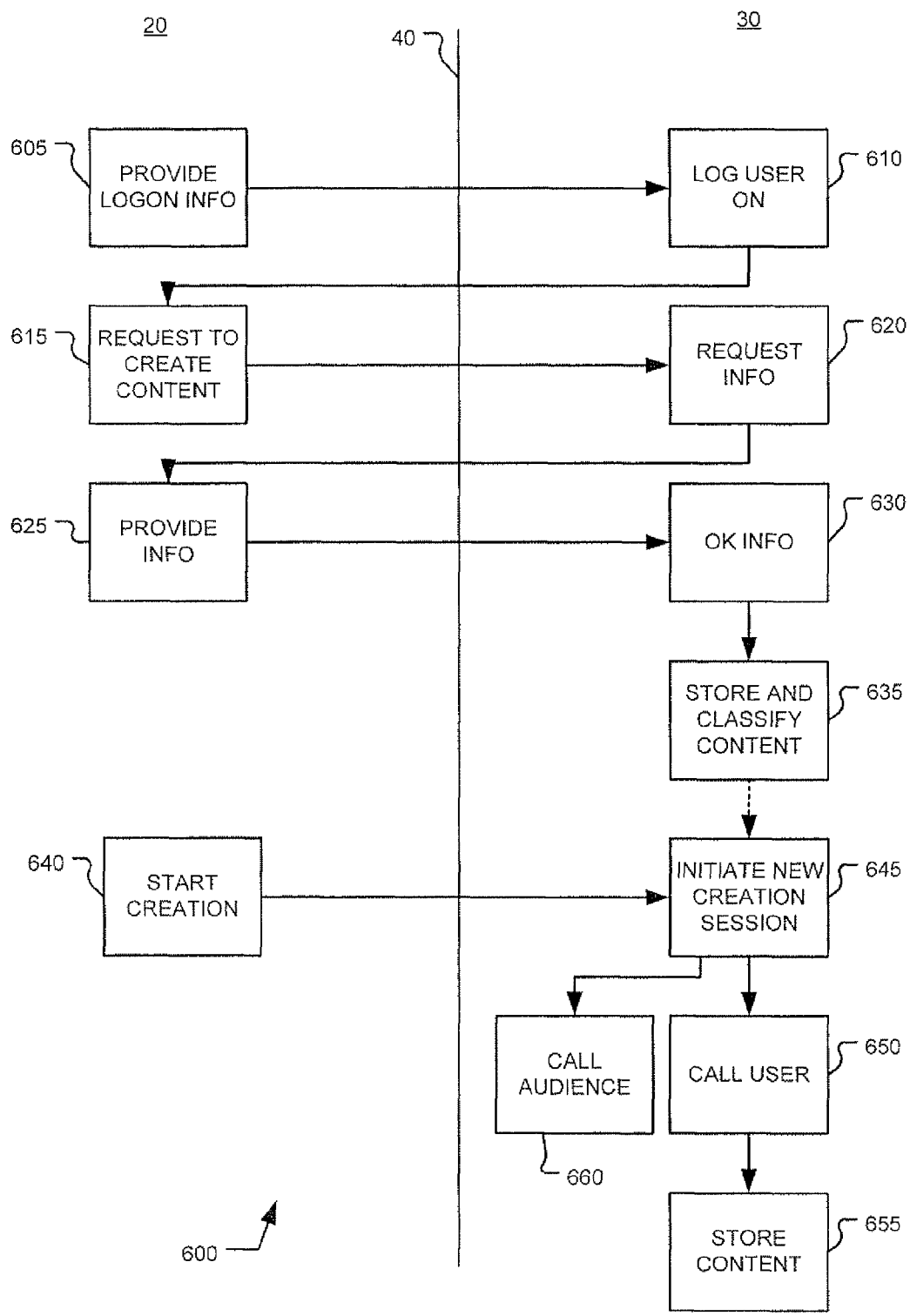
FIG. 15 illustrates a flow diagram of a process according to an embodiment of the present invention.

Referring now to FIGS. 1A and 15, there is shown a flow diagram of a process 600 according to an embodiment of the present invention. Process 600 is suitable for permitting users to create presentations, such as by hosting an audio show that may be recorded to create a podcast, using computers 20, 30.

Process 600 commences with a user providing log on information using a computer 20 at block 605, which is provided to computers 30 via network 40, in certain embodiments to server 34. Computers 30 log the user on at block 610, and communicates this status to the user via network 40, in certain embodiments by serving a page 200 (FIGS. 11, 12) to the logged on user's computer 20.

At block 615, the logged on user requests to create content or host a show, e.q., by interacting in a conventional manner with web page 200. This request is provided to computers 30 via network 40. At block 620, computers 30 request information regarding the content to be created. In certain embodiments, the requested information may include a content title, date, series information and description, akin to that displayed in a corresponding indicator 240 (FIGS. 11, 12). The request may further include a phone number at which the user may be reached. This request may be communicated to the user's computer 20 via network 40.

At block 625, the user provides at least a portion of the requested information, which is communicated to computers 30 via network 40. Some or all of the information provided may be screened or filtered or verified by the validation at block 630. In certain embodiments of the present invention, information provided at block 625 may be received and screened or filtered or verified by the validation at block 630 using web server 34. In certain embodiments of the present invention, the user's phone number may be checked to see if it is valid. All or a portion of that information may then be stored at block 635 using database server 32, for later use in populating web pages 200, for example.

At block 640, the requesting user indicates he would like to begin creating the presentation, e.g., by interacting in a conventional manner with web page 200. This indication is communicated to computers 30 via network 40. At block 645 computers 30 initiate a new presentation creation session. At block 650, a voice communications session between computers 30 and the user is commenced. In certain embodiments of the present invention, a telephone call may be automatically placed by computers 30 at block 650 to the phone number indicated at block 625.

Figure 16:
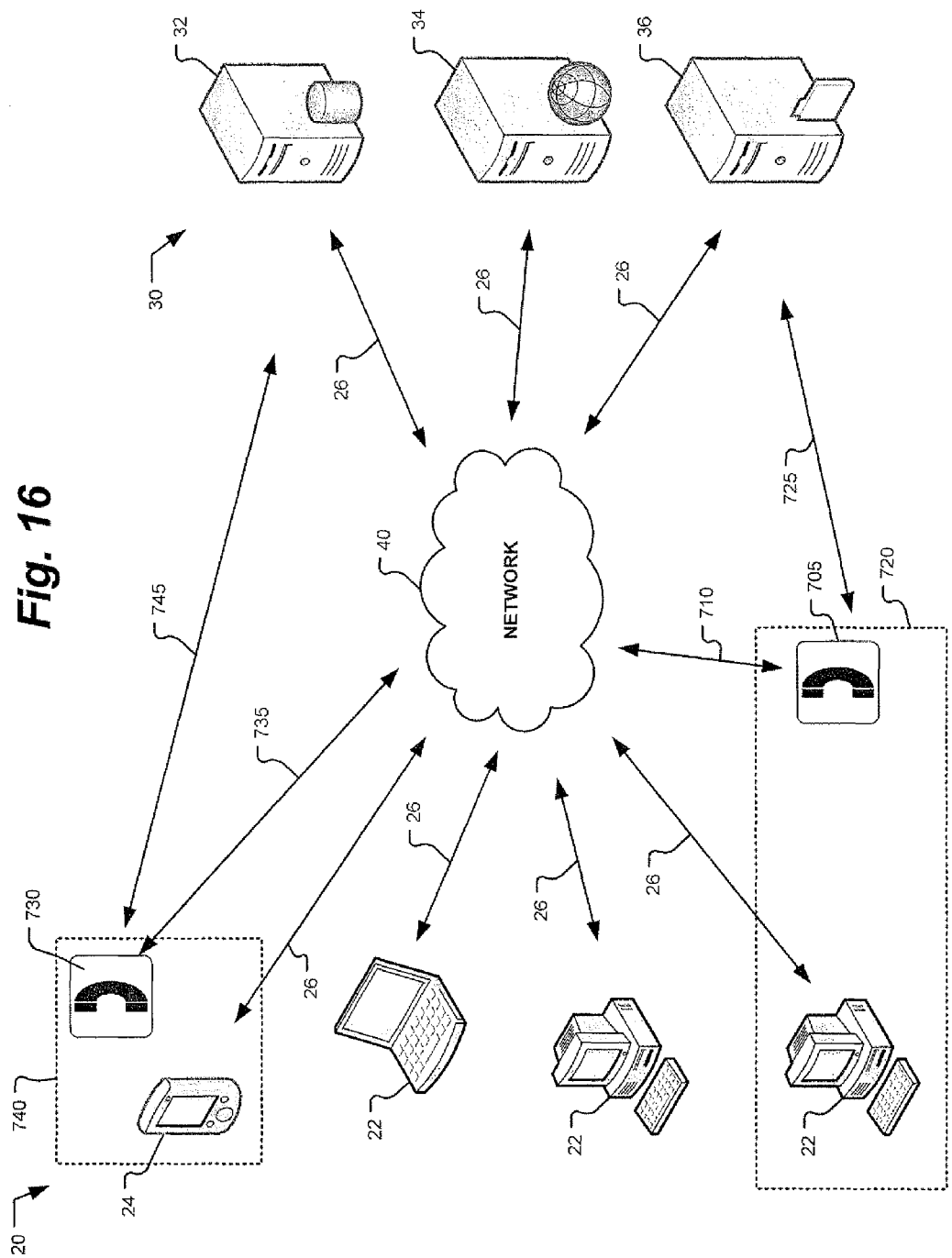
FIG. 16 illustrates a block diagram of a system of networked computers in conjunction with telecommunications devices according to an embodiment of the present invention.

Referring now to FIG. 16, there is shown a block diagram of a system of networked computers and telephones 700. Like system 10, illustrated system 700 includes personal computing devices 22 and a personal digital assistant computer 24 by way of non-limiting example only. Communication links 26 communicatively couple devices 20 with network 40. Links 26 may take the form of wired and/or wireless communications links, including fiber optic, POTS, DSL, cable and/or multiple access or 88M based wireless telephony or data communications systems, for example. Network 40 may include portions of proprietary and service provider networks, as well as the Internet, for example. Illustrated system 10 includes a database server 32, a content or web server 34 and a file server 36, all by way of non-limiting example only. Communication links 26 communicatively couple devices 30 with network 40 as well.

System 700 additionally includes conventional telephone 705 associated with (as indicated by label 720) with a particular computing device 22, e.g., by both corresponding to a given requesting user, for example. In the illustrated embodiment, phone 705 may be communicatively coupled to computers 30 independent of network 40 (e.g., 725). In the illustrated embodiment, phone 705 may be communicatively coupled to computers 30 via network 40 (e.g., 710). In certain embodiments of the present invention phone 705 may take the form of a POTS phones. In certain embodiments of the present invention phone 705 may take the form of a VoIP phone. In certain embodiments of the present invention, phone 705 may take the form of a cellular phone. In certain embodiments of the present invention, phone 705 is independent of the associated computer 22. In certain embodiments of the present invention, phone 705 may be communicatively coupled to computers 30 independent of any connection between the associated computer 22 and computers 30.

Referring now to FIGS. 15 and 16, a requesting user may be called at block 650 by computers 650 placing a conventional telephone call to the phone number provided at block 625. Upon the call being answered using phone 705, a pre-recorded audio message indicating the content will be created may be played. Thereafter, the requesting user, or his designee for example, may speak into phone 705, thereby hosting a show, for example. Responsively thereto, computers 30 may digitize the spoken show and store a media file indicative of it (e.g., using file server 36), as indicated at block 655.

Referring still to FIGS. 15 and 16, information provided at block 625 and stored at block 635 may include identifications of intended audience members for the presentation, e.g., an audience for the show to be hosted. This additional information may be used at block 660 to initiate analogous telephone calls to those numbers as well. In this way, a phone audience may hear the show live at a plurality of locations. For non-limiting purposes of explanation, this is shown in FIG. 16 as phone 730, which is associated with PDA 24 by label 740.

Such a "dial out" functionality allows for an understanding of where the user/viewer/listener can be reached and/or located, may allow for myriad additional features in the present invention. For example, a pinpoint geographic location of broadcast listeners may be placed on a map, such as via website 200 to thereby illustrate where other listeners of the broadcast are specifically located. Such a mapping functionality may be realized using a commercially available mapping application, such as Google Maps, for example.

It should further be understood such a content generation functionality provides additional advantages, For example, enhanced telephone conferences may be readily achieved according to certain embodiments of the present invention. Such enhanced conferences may exhibit an automatic dial out to conference attendees, including the host and audience. Such enhanced conferences may exhibit automatic recording and archival for later playback as a podcast, for example. Such enhanced functionalities may advantageously be achieved without the host having access to any particular resources other than a general purpose Internet enabled computer and a conventional telephone. Such enhanced functionalities may advantageously be achieved without the any audience member having access to any particular resources other than a conventional telephone. Accordingly, enhanced telephone conferencing may be readily achieved.

In certain embodiments of the present invention, certain portions of aggregated content may have access thereto restricted to authorized members. For example, information provided at blocks 425, 525 and/or 625 may include an authorized group identifier or content password. Such an identifier and/or password may be stored using database server 32. When a user seeks to playback such protected content, e.g., by interacting with web page 200 as set forth above, the user may need to log in (e.g., blocks 405, 410, 505, 510, 605, 610) or provide the corresponding password. Where a group identifier is used, database server 32 may indicate what groups a logged in user is authorized for, so as to selectively permit access to protected content to authorized users. Such groups may, by way of non-limiting example only, include businesses and other private organizations.

Figure 17:
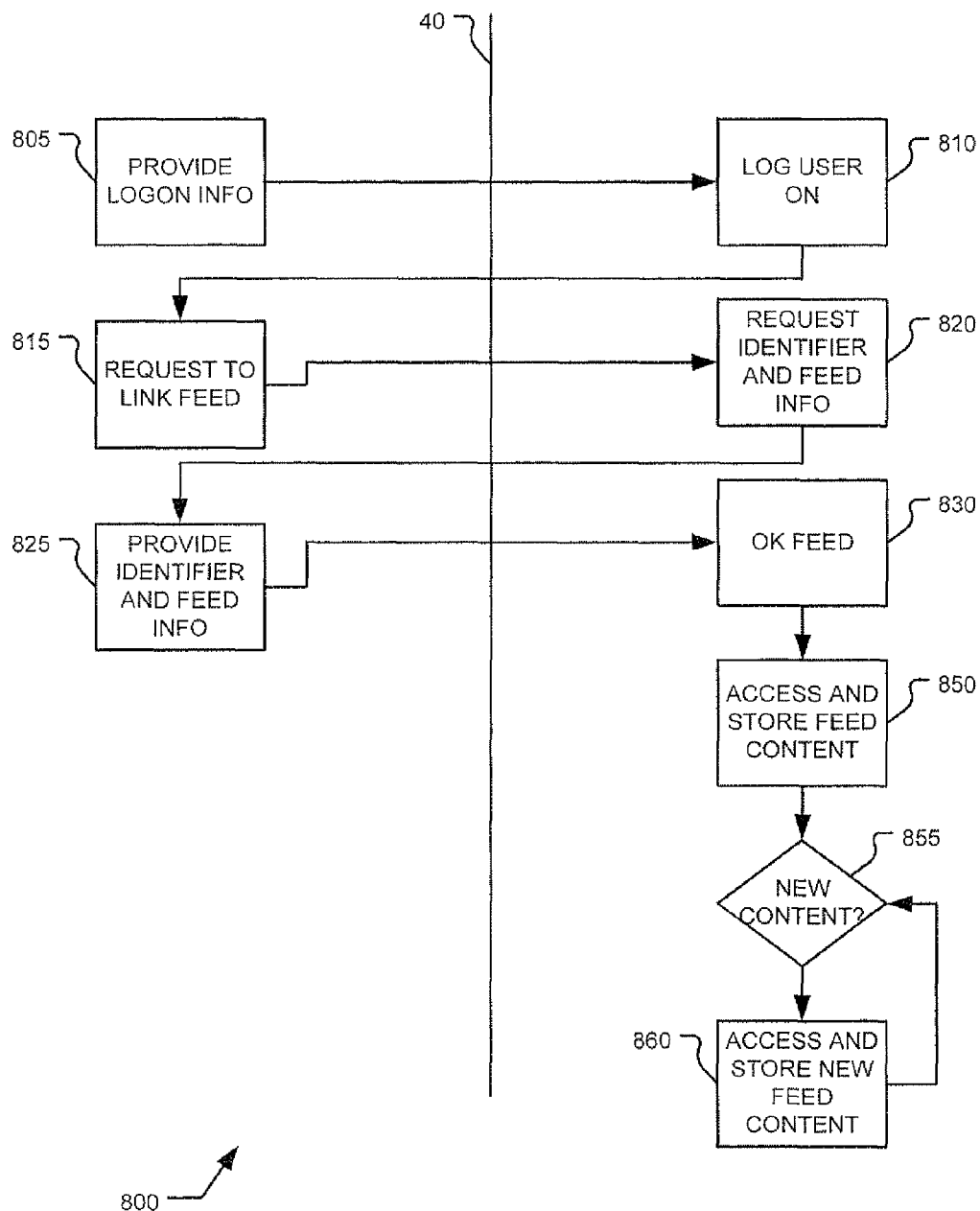
FIG. 17 illustrates a flow diagram of a process according to an embodiment of the present invention.

Referring now to FIGS. 1A and 17, there is shown a flow diagram of a process 800 according to an embodiment of the present invention. Process 800 is suitable for automatically aggregating and linking to presentations housed elsewhere in memory so as to be accessible to a computer 20 (FIG. 1A) via network 40 (FIG. 1A)—essentially registering them with database server 32 (FIG. 1A).

Syndication of Internet content is becoming more commonplace. Really Simple Syndication ("RSS") is a family of Internet feed formats used to publish content that may be frequently updated, such as podcasts (RSS 2.0). RSS utilizes a standardized format. An RSS document (sometimes referred to as a "feed," "web feed" or "channel") typically contains either a summary of content from an associated web site or the full text.

An RSS may itself be used to aggregate content from multiple web sources in one place. RSS content is typically accessed using an RSS reader application. Such an application may be a thin, web-page based application or a downloaded application executed on a user's computer (e.g., 20, FIG. 1A). RSS feeds may typically be subscribed to by entering or selecting the feed's link using the reader. The RSS reader typically checks the user's subscribed feeds for new content at predetermined intervals, downloads updates, and provides a user interface to monitor and view the feeds.

Embodiments of the present invention will be discussed with regard to RSS 2.0 feeds for non-limiting purposes of explanation only. It should be recognized that embodiments of the present invention may be suitable for use with other types of content (e.g., audio/video) feeds.

Referring again to FIG. 17, process 800 commences with a user providing Jog on information using a computer 20 at block 805, which is provided to computers 30 via network 40, in certain embodiments to server 34. Computers 30 log the user on at block 810, and communicates this status to the user via network 40, in certain embodiments by serving a page 200 (FIGS. 11, 12) to the logged on user's computer 20.

At block 815, the logged on user requests to link an RSS feed, e.g., by interacting in a conventional manner with web page 200. This request is provided to computers 30 via network 40. At block 820, computers 30 request information regarding the content to be created. In certain embodiments, the requested information may include a content title, series information and description, akin to that displayed in a corresponding indicator 240 (FIGS. 11, 12). The request may further include RSS feed identification and/or access information through which the feed may be accessed. This request may be communicated to the user's computer 20 via network 40.

At block 825, the user provides at least a portion of the requested information, which is communicated to computers 30 via network 40. Some or all of the information provided may be screened or filtered or verified by the validation system at block 830. In certain embodiments of the present invention, information provided at block 825 may be received and screened or filtered or verified by the validation system at block 830 using web server 34. In certain embodiments of the present invention, the feed identifier and/or access information may also be checked by the validation system to see if it is valid. All or a portion of that information may then be stored at block 850 using database server 32, for later use in populating web pages 200, for example. At block 850, the feed may further be accessed to acquire information regarding and/or either links to or the fed content itself then present All of this information may be automatically aggregated using computers 30 in accordance with the methods described hereinabove with regard to FIGS. 13 and/or 14, where the feed information (e.g., RSS associated XML data) is used in lieu of user provided information. The date and time when content is automatically acquired via such a registered RSS feed may also be stored at block 850 using computers 30, e.g., database server 32.

At block 855, computers 30 may determine if new content exists for any feed stored at block 850. This may be accomplished in any of a number of conventional manner, including checking when the feed was last updated and/or the content available there-through to data stored at block 850. When new or changed content is found, the data stored at block 855 may be appended or amended to reflect the new content.

It should further be understood such a content acquisition provides additional advantages. For example, each user wishing to identify and view content available via an RSS feed may conventionally need to obtain and operate an RSS reader application. Further, each such RSS reader application would need to access each identified RSS feed. This leads to substantial bandwidth usage, for example. In contrast, certain embodiments of the present invention permit a user to access RSS content without the need for his own RSS reader. Further, embodiments of the present invention only require that system 30 access each RSS feed, as opposed to each system 30 user computer 20 wishing to access the RSS feeds, leading to substantial savings In network resources. Further, certain embodiments of the present invention allow user to access and compare content available via RSS feeds they are not even aware of e.g., by their interaction with webpage 200 as discussed above, where webpage 200 includes content added using the methodology of process 800, for example. Accordingly, certain embodiments of the present invention provide for enhanced content syndication and aggregation, as compared to even RSS feeds themselves, for example. And, certain embodiments of the present invention provide for automatic aggregation of RSS fed content in combination with non-RSS fed content in a single application independent of any user RSS reader application.

As described herein, the present invention includes the aforementioned validation engine, system and method for processing links, feeds or any identifier and/or location depiction for the verification and/or validation of content. For example, a web page may be made up of static and/or dynamic HTML content, certain of which content may require validation prior to use in the present invention, and/or prior to accessing such content as a live link by the engine, system and methods taught herein.

In certain embodiments of the present invention, each page, link or feed may be individually validated using a separate thread. Alternatively and additionally, pages, links, or feeds may be batch-validated, such as, for example, wherein multiple links are validated in parallel. In certain embodiments, only links or feeds that point to content located on different servers or domains other than the server from which the current content originated may be verified or validated, although alternative methodologies may also be employed in order to assess which links or feeds are to be validated.

Figure 18:
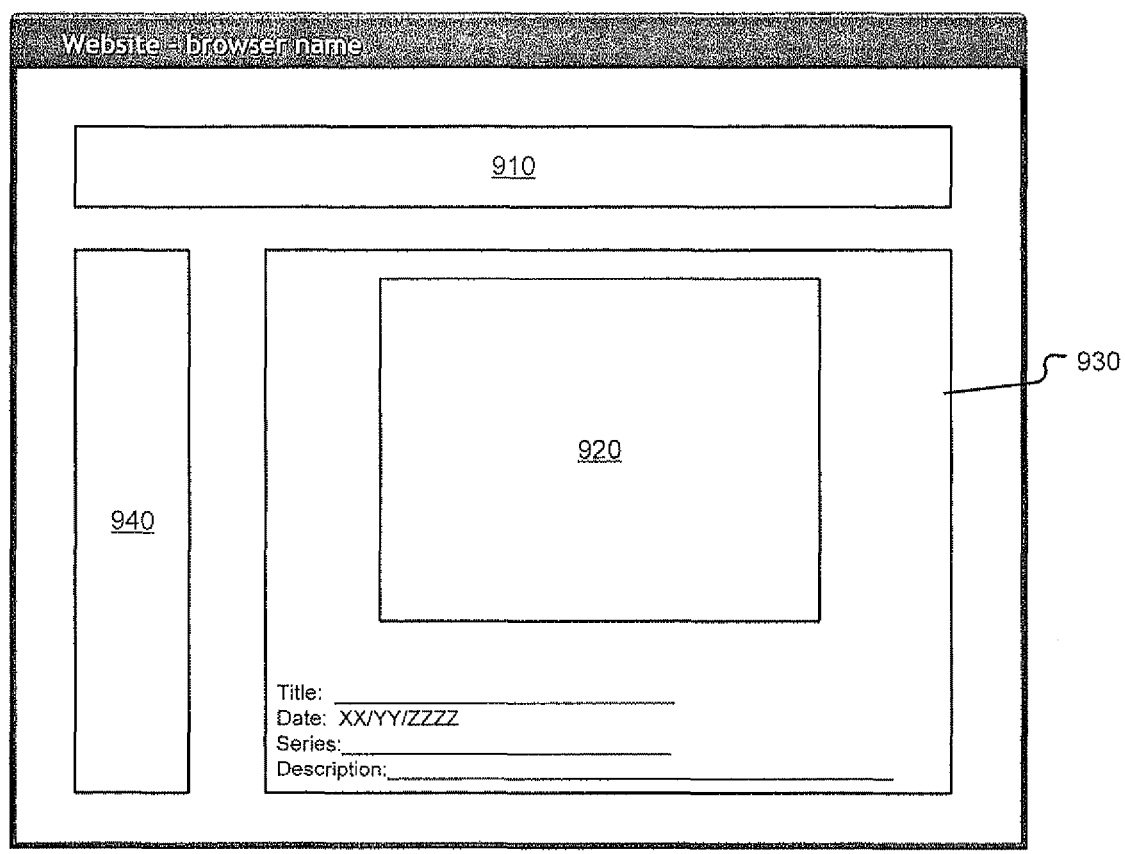
FIG. 18 illustrates an electronic document according to an embodiment of the present invention.

According to an aspect of the present invention, a process for validating content 900 is depicted in FIG. 18. First, the content to be validated is identified at step 910. Next, the identified content is placed in an initial validating state 920. Thereafter, a thread is created 930 for any link or feed associated with the content. In step 940, the system receives a result from the thread. In step 950, the system determines whether the link or feed is valid based on the received result. If the link or feed is valid, then at step 960 the system determines whether additional results are expected and/or received from the thread. If additional results are not expected or received, the process terminates. If it is determined at step 950 that the link or feed is not valid, the link or feed is removed and/or tagged such that the system no longer pursues content based on the invalid link or feed.

In certain embodiments of the present invention, the validation system may begin by sending a request to the URL of the content link. In this embodiment, a determination can then be made as to whether content is returned in response to the request. If no content is present at the location identified by the URL, an error message or code may be returned. Upon receipt of an error code, the content link or feed may be deemed invalid, and follow subsequent steps for invalid links or feeds as provided above. If content is returned, the link may be identified as valid, and follow subsequent steps for valid links or feeds as provided above. In certain embodiments, if an error message or code has not been returned, a determination may be made as to whether a timeout occurred. If timeout has not occurred, the process continues to determine if content has been returned.

As previously described, the present invention allows a user to subscribe to an RSS feed, based, at least in part, on a search over a network, The searching component allows the user to perform the search for content associated with an RSS feed that substantially matches at least a portion of a search query. In certain embodiments, the user may employ a structured query language (SOL) instruction. In certain embodiments, the user may provide to the search component a Boolean expression that is useable to search for content associated with an RSS feed. In certain embodiments, the user may select a search query from a list of available search queries.

In all such embodiments, the results from the search may be evaluated via the validation system to verify that a valid RSS feed is available, or that at least one RSS feed is associated with the each resulting content source identifier. In certain embodiments, the search component may compare the search query results against RSS feed identifiers stored in a data storage location. In another embodiment, the search component may review for patterns that identify the result as an RSS feed. Results that are determined to be unassociated with an RSS feed may be discarded or tagged. In one embodiment, where the search query results may be selectable as an RSS feed, validation may be performed to determine whether the search results include content. In certain embodiments, a list of validated RSS feeds may be provided to the user for selection. The user may then select from the list and subscribe to a validated RSS feed. In the event the RSS feed is determined to be invalid, it is removed and/or tagged, such that the system no longer pursues the invalid feed.

In certain embodiments of the present invention, more detailed tracking information may be desired. For example, it may be desirable to know not only that a certain number of users requested and accessed certain presentations, but also how long a user actually watched, and/or listened, to a presented program, after selection via webpage 200 (FIGS. 11, 12), for example. Certain embodiments of the present invention may provide the ability to track the number of visitors to the platform of the present invention, and additionally the number of visitors per content via the platform of the present invention, and additionally information regarding how long presentations were watched and/or listened.

For example, and referring now to FIG. 18, there is shown a view of a web page 900 according to an embodiment of the present invention. Web page 900 generally includes portions 910, 920, 930 and 940. Web page 900 may be provided to a user's computer 30 responsively to user selection of a presentation shown on a populated web page 200 (FIG. 11). By way of non-limiting explanation, should a user viewing web page 200 (FIG. 11) select a presentation 265 for viewing and/or listening, a suitably populated web page 900 may be served by computers 20. In such a served web page 900, portion 930 may be utilized to playback the selected presentation in a conventional manner, e.g., by downloading the content into or streaming the content to a media player application or plug-in. Portions 910, 940 may be used to display related information, such as advertisements for example. In such a case, it may be desirable to be able to reliable identify how long the media was actually, or may typically be played, in order to appropriately value portions 910, 920 as available advertising billboard space. By way of further, non-limiting example, while a per-click or per-display pricing schedule for portions 910, 940 may be used, where portion 920 is used to play-back content a typical user watches and/or listens to for ten minutes, portions 910, 940 may be worth more than where content play-back is typically for less than thirty-seconds.

Where content is directly stored using an operator's system (e.g., computers or computer system 20, FIG. 11), such as by using the methodology of process 400 (FIG. 13) or process 600 (FIG. 15), such a tracking may be achieved by tracking requests from and pages viewed by each visitor, such as in a tabular format. As a system operator maintains control over the operation of system 30 in such a case, system 30 may be monitored to determine how long data is streamed therefrom, for example Data indicative of this period, such as a presentation identifier and a value indicative of the time the presentation was actually streamed for, may be logged by system 30 (e.g., using database server 32, for example). For example, it may be determined when a user begins and ends listening to and/or watching a presentation, e.g., a podcast, by tracking when a web page was loaded and for example by determining when streaming of data to such a loaded web page ceases. Where a selected presentation is streamed from computers 20, such a methodology may be directly implemented by system 20, by confirming the content streaming is progressing as expected, for example.

Where content is not uploaded to an operator's system (e.q., computers or computer system 20, FIG. 11) and is instead remotely stored from yet aggregated by system 30, e.g., using the methodology of process 500 (FIG. 14) or process 800 (FIG. 17), for example, tracking may not be so straight forward. As an operator of system 30 does not necessarily exercise control over the content data storage resource, the operator may not be able to directly operate the storage resource in a manner to directly track how long content is streamed therefrom to a particular user.

In certain embodiments of the present invention, aggregated content playback may advantageously be tracked in a substantially same manner, regardless of whether it is streamed from system 30 or otherwise unrelated computer systems operated by third parties. In certain embodiments of the present invention, tracking information may be continuously or substantially continuously updated for as long as a user continues to watch or listen to a particular show, regardless of whether the content data is streamed from an operator's computer system 30 or a third party's computer system.

Figure 19:
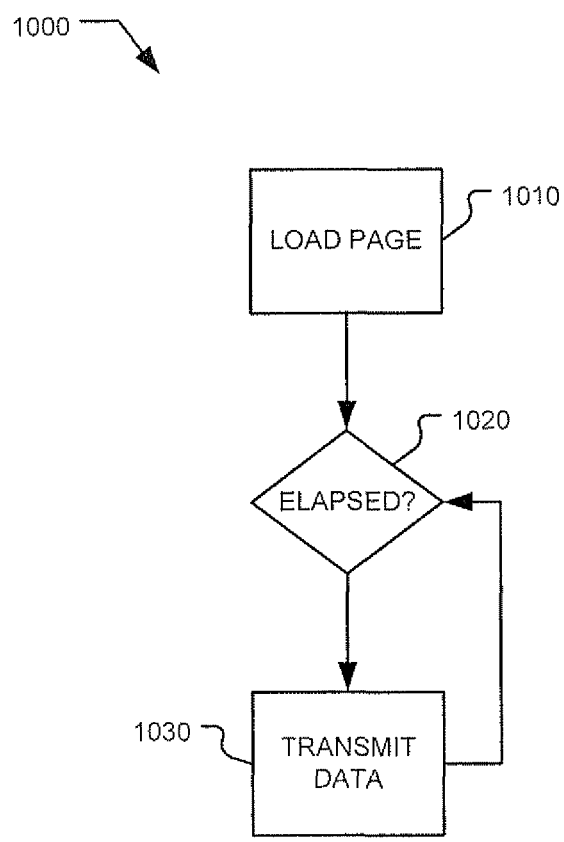
FIG. 19 illustrates a flow diagram of a process according to an embodiment of the present invention.

Referring now to FIG. 19, there is shown a block diagram of a process 1000 according to an embodiment of the present invention. Process 1000 commences with a user's computer 20 receiving a web page from system 20 (FIG. 11) at block 1010. Such a received web page may take the form of page 900 (FIG. 18), for example. As is shown in FIG. 18, page 900 includes portion 930, which may be used to play-back user selected content via his computer 20 and a suitable plug-in or media player, for example. As explained herein, data indicative of the content played using portion 920 may be supplied by system 30 or a third party's computer system. Regardless, page 900 may include a timer applet. "Applet", as used herein, generally refers to a software component that runs in the context of another program, in the case of page 900 of FIG. 18, a web browser. Such an applet may typically used to perform a specific function or task, usually narrow in scope. In the case of FIGS. 18 and 19, such a timer applet may be used to indicate when a pre-determined temporal period has elapsed. For example, such an applet may be used to indicate each time some temporal period, such as 10, 15 or 30 seconds, elapses. Such a timer applet may be started at block 1020.

At block 1030, when the applet determines the predetermined temporal period has elapsed, it signals its continued execution to system 20. In response, system 30 may log receipt of this indication, such as by using database server 32.

In certain embodiments of the present invention, web page 900 (FIG. 18) may be accompanied with identifying data, such as in form of a cookie. A "cookie", as used herein, generally refers to a message provided to a web browser by a web server. The browser stores the message in a data or text file. In certain embodiments of the present invention, the applet may cause the cookie, or associated data, to be transmitted from the user's computer 20 to system 30, where upon receipt it, or data associated with it, may be logged, such as by using database server 32.

By way of further non-limiting example, at each expiration of temporal period as determined by the timer applet, such as every 15 seconds, a table entry may be made of the user, the page the user is on, and, to the extent the user is on the same page as was the user upon the last expiration of the timer, the user's total time, to the current time, spent on that same page using database server 32. The user may be identified by, for example, any of a number of known methodologies, such as the information the user used to login, the user's IP address, the user's response to an identifying query, or the like.

In certain embodiments of the present invention, the timer applet may cause data indicative of the total time spent on the web page presenting the presentation that has elapsed. In certain embodiments of the present invention, the timer applet may cause data indicative of another temporal cycle having passed while the web page presents the presentation. In the latter, a value indicative of the number of cycles that have passed in database 32 may be incremented each time the data is received, for example.

Thus, certain embodiments of the present invention provide the capability to know that a viewer began viewing a particular show at a certain time, and to know when a user began viewing a different page, or show, thereby providing knowledge of how long a particular viewer spent on a particular page. Such knowledge is not conventionally available, and the provision of such knowledge by certain embodiments of the present invention allows for an increasing scale of payments for advertising displayed on a given page correspondent to how long a viewer or viewers remain, or typically remain, on that particular page or like pages. Thus, the tabular tracking of the present invention allows for the knowledge of how long viewer spends on a page, what the viewer was viewing or listening to on the given page, the ads shown while the viewer was viewing or listening, how long the ads were shown, and what ads were shown to the view correspondent to that viewer's identification and/or login.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention.

What is claimed is:

1. A non-transitory computer readable medium storing a computer program which when executed by a processor on a computer performs a method for providing a platform, the method comprising:
   providing a graphical user interface;
   presenting one or more content items on a web page to a user of said graphical user interface, wherein said one or more content items comprise at least one crawling RSS feed and at least one selected from a group consisting of audio, video, photographs, data files, metadata, blogs, and links;
   presenting one or more advertisements on the web page of the graphical user interface in accordance with a relevance to said one or more content items in view of the user, wherein the relevance increases over time as the at least one RSS feed crawls; and
   performing, to achieve the increase in relevance of the one or more advertisements over time, using a relevancy increasing engine, at least one of an updating and a re-instantiation of the web page responsively to a timer, wherein the at least one of the updating and the re-instantiation exclusively provides the increase in the relevance.

2. The non-transitory computer readable medium of claim 1, wherein said relevancy increasing engine provides the increase in the relevance responsive solely to the one or more content items.

3. The non-transitory computer readable medium of claim 2, wherein said relevancy increasing engine provides the increase in the relevance responsive solely to the one or more content items in a primary window of said graphical user interface.

4. The non-transitory computer readable medium of claim 1, wherein said graphical user interface comprises the web page.

5. The non-transitory computer readable medium of claim 1, wherein said graphical user interface comprises quadrants.

6. The non-transitory computer readable medium of claim 5, wherein the relevance of said one or more advertisements varies in accordance with the quadrant.

7. The non-transitory computer readable medium of claim 5, wherein a cost for each of said one or more advertisements varies in accordance with the quadrant.

8. The non-transitory computer readable medium of claim 5, wherein a response by the user to each of said one or more advertisements varies in accordance with the quadrant.

9. The non-transitory computer readable medium of claim 1, wherein said one or more content items are provided to said graphical user interface exclusively via the RSS feed and at least one selected from the group consisting of audio, video, photographs, data files, metadata, blogs, and links, provided via secondary RSS feeds.

10. The non-transitory computer readable medium of claim 1, wherein the relevance improves during a current instance of the graphical user interface.

11. The non-transitory computer readable medium of claim wherein the relevance improves with each subsequent instance of the graphical user interface.

12. The non-transitory computer readable medium of claim 1, further comprising one or more tracking databases in communicative connection with said graphical user interface.

13. The non-transitory computer readable medium of claim 12, wherein the one or more tracking databases track at least one of visit time per one of the users to each of the content items, ones of the content items viewed by each one of the users, and prior ones of the content items viewed by each one of the users.

14. The non-transitory computer readable medium of claim 1, further comprising a content generation interface associated with said graphical user interface for generating ones of the one or more content items.

15. The non-transitory computer readable medium of claim 14, wherein said content generation interface comprises a content upload interface.

16. The non-transitory computer readable medium of claim 14, wherein said content generation interface comprises a content channel generation interface.

17. The non-transitory computer readable medium of claim 1, wherein said relevancy increasing engine comprises an RSS feed crawler.

18. The non-transitory computer readable medium of claim 1, wherein said relevancy increasing engine comprises an RSS feed checker.

19. The non-transitory computer readable medium of claim 1, wherein said graphical user interface comprises a log-in interface.

20. The non-transitory computer readable medium of claim 1, wherein said graphical user interface comprises an interface for receiving a dial out.

21. The non-transitory computer readable medium of claim 1, wherein said step of performing at least one of an updating and a re-instantiation of the web page results in displaying a second set of one or more advertisements which differ from the one or more advertisement presented in said presenting step.

22. The non-transitory computer readable medium of claim 21, wherein the second set of one or more advertisements has increased relevance with respect to the one or more content items in view of the user compared to the one or more advertisements presented in said presenting step.

* * * * *